(12) United States Patent
Su et al.

(10) Patent No.: US 11,686,918 B2
(45) Date of Patent: Jun. 27, 2023

(54) IMAGING LENS DRIVING MODULE AND ELECTRONIC DEVICE

(71) Applicant: LARGAN DIGITAL CO., LTD., Taichung (TW)

(72) Inventors: Heng Yi Su, Taichung (TW); Ming-Ta Chou, Taichung (TW); Te-Sheng Tseng, Taichung (TW); Ming-Shun Chang, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 300 days.

(21) Appl. No.: 17/090,478

(22) Filed: Nov. 5, 2020

(65) Prior Publication Data

US 2022/0082782 A1 Mar. 17, 2022

(30) Foreign Application Priority Data

Sep. 16, 2020 (TW) .................................. 109131902

(51) Int. Cl.
*G02B 7/04* (2021.01)
*G02B 27/64* (2006.01)

(52) U.S. Cl.
CPC .............. *G02B 7/04* (2013.01); *G02B 27/646* (2013.01)

(58) Field of Classification Search
CPC ... G02B 7/04; G02B 7/02; G02B 7/00; G02B 27/646; G02B 27/64
USPC ....................................................... 359/822
See application file for complete search history.

(56) References Cited

U.S. PATENT DOCUMENTS

| 7,158,316 | B2 | 1/2007 | Chang et al. |
| 7,590,342 | B2 | 9/2009 | Wu et al. |
| 7,885,023 | B2 | 2/2011 | Kim |
| 7,893,568 | B2 | 2/2011 | Huang |
| 8,139,146 | B2 | 3/2012 | Lee |
| 8,379,337 | B2 | 2/2013 | Wade et al. |

(Continued)

FOREIGN PATENT DOCUMENTS

| CN | 102023365 A | 4/2011 |
| CN | 104849831 A | 8/2015 |

(Continued)

OTHER PUBLICATIONS

Indian Action dated Apr. 20, 2022 as received in application No. 202134016042.

(Continued)

*Primary Examiner* — William R Alexander
(74) *Attorney, Agent, or Firm* — Maschoff Brennan

(57) ABSTRACT

An imaging lens driving module includes a base, a casing, a driving mechanism and a damping element. The base has an opening, and the casing has a central aperture corresponding to the opening. The casing includes a plastic frame portion and a metal structure portion. The plastic frame portion is coupled to the base. The metal structure portion has a plurality of pins extending towards the base. The driving mechanism is disposed in the casing. The driving mechanism is configured to drive the lens unit to move in a direction parallel to an optical axis. The damping element is connected to the pins and the lens unit. The metal structure portion is insert-molded with the plastic frame portion to form the casing. The pins are located closer to the optical axis than the other part of the metal structure portion to the optical axis.

16 Claims, 27 Drawing Sheets

(56) References Cited

U.S. PATENT DOCUMENTS

| | | | |
|---|---|---|---|
| 8,611,735 B2 | 12/2013 | Sekimoto | |
| 8,958,690 B2 | 2/2015 | Kim et al. | |
| 8,995,068 B2 | 3/2015 | Baik et al. | |
| 9,195,026 B1 | 11/2015 | Chen et al. | |
| 9,835,818 B2 | 12/2017 | Kuo et al. | |
| 10,359,599 B2 | 7/2019 | Hsu et al. | |
| 10,432,834 B2 | 10/2019 | Liu et al. | |
| 2008/0007850 A1* | 1/2008 | Huang | G02B 7/08 310/311 |
| 2017/0242318 A1* | 8/2017 | Sato | G03B 9/06 |
| 2019/0011665 A1 | 1/2019 | Huang et al. | |
| 2019/0235201 A1 | 8/2019 | Lu | |
| 2019/0278050 A1 | 9/2019 | Lu | |
| 2019/0339480 A1 | 11/2019 | Tseng | |
| 2020/0116973 A1 | 4/2020 | Chou | |

FOREIGN PATENT DOCUMENTS

| | | |
|---|---|---|
| CN | 105388582 A | 3/2016 |
| CN | 105676407 A | 6/2016 |
| CN | 109618104 A | 4/2019 |
| TW | I647481 B | 1/2019 |
| TW | 201907194 A | 2/2019 |
| WO | 2012005141 A1 | 12/2012 |

OTHER PUBLICATIONS

Taiwan Office Action dated Apr. 27, 2021 as received in application No. 109131902.

* cited by examiner

IMAGING LENS DRIVING MODULE AND ELECTRONIC DEVICE

RELATED APPLICATIONS

This application claims priority to Taiwan Application 109131902, filed on Sep. 16, 2020, which is incorporated by reference herein in its entirety.

BACKGROUND

Technical Field

The present disclosure relates to an imaging lens driving module and an electronic device, more particularly to an imaging lens driving module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

A conventional lens assembly usually includes a lens barrel and a lens carrier assembled together by their thread structures. The position of the lens barrel with respect to the lens carrier is adjustable by rotating the lens barrel so as to focus images onto the image surface of the image sensor. However, the design requirements of thread structures may inevitably increase the size of the lens assembly and the assembling complexity. Furthermore, many conventional lens assemblies on the market usually have a voice coil motor (VCM) as a camera driver module for auto focus, and this kind of camera driver module usually consists of several components. For the requirements of accuracy and smoothness of movement of the lens unit, multiple alignment and calibration steps are needed during the assembly process of the camera driver module and the lens unit itself in order to complete the assembly of those components accurately. As a result, the manufacturing efficiency and yield rate of the camera driver module are therefore influenced.

Accordingly, how to improve the camera driver module for increasing yield rate so as to meet the requirement of high-end-specification electronic devices is an important topic in this field nowadays.

SUMMARY

According to one aspect of the present disclosure, an imaging lens driving module includes a base, a casing, a driving mechanism and a damping element. The base has an opening. The casing has a central aperture corresponding to the opening. The casing includes a plastic frame portion and a metal structure portion. The plastic frame portion is coupled to the base. The metal structure portion has a plurality of pins extending toward the base. The driving mechanism is disposed in the casing, and the driving mechanism is configured to drive a lens unit to move in a direction parallel to an optical axis. The damping element is connected to the plurality of pins and the lens unit. In addition, the metal structure portion is insert-molded with the plastic frame portion to form the casing, and the plurality of pins of the metal structure portion are located closer to the optical axis than other part of the metal structure portion to the optical axis.

According to another aspect of the present disclosure, an electronic device includes the aforementioned camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
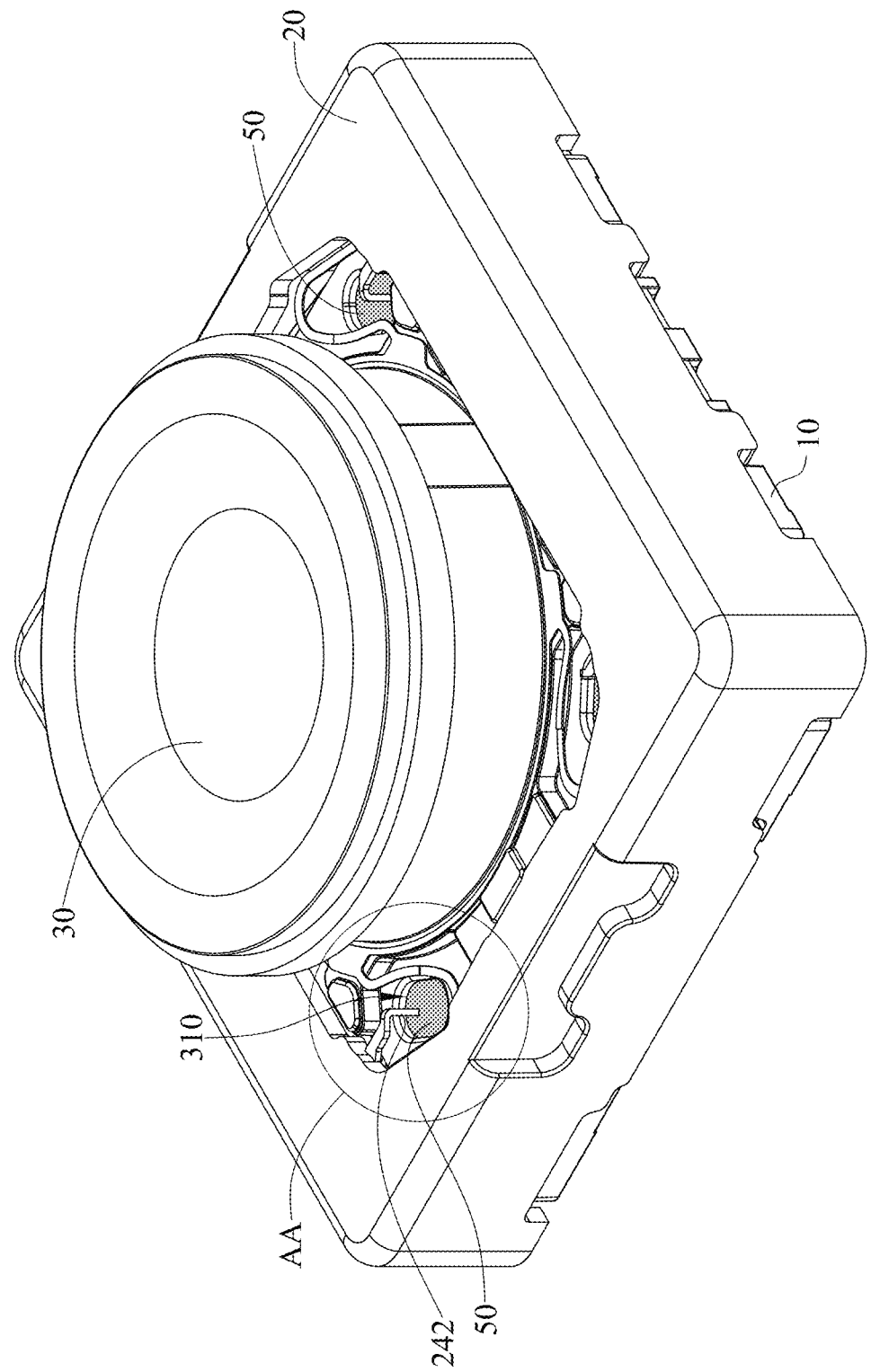
FIG. 1 is a perspective view of an imaging lens driving module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens driving module, and the imaging lens driving module includes a base, a casing, a driving mechanism and a damping element.

The base has an opening. The casing has a central aperture corresponding to the opening of the base. The casing includes a plastic frame portion and a metal structure portion, the plastic frame portion is coupled to the base, and the metal structure portion is insert-molded with the plastic frame portion to form the casing. Therefore, the insert-molding process for manufacturing the casing is favorable for reducing assembly errors between the plastic frame portion and the metal structure portion. The plastic frame portion is, for example, a one-piece formed plastic element having a rectangular appearance and surrounding the central aperture, but the present disclosure is not limited thereto. The metal structure portion can be an elastically deformable metal material, but the present disclosure is not limited thereto. The metal structure portion has a plurality of pins extending toward the base, and the pins are closer to the optical axis than the other part of the metal structure portion (e.g., a main portion attached on the surface of the plastic frame portion, and connection arms connected to and located between the pins and the main portion) to the optical axis. The ends of the pins of the metal structure portion closest to the base can be in arbitrary polygons structures. The proper rigidity of the metal structure portion made of suitable material (e.g., a material including iron) is favorable for reducing the complexity of injection molding. In addition, the plastic frame portion of the casing features good filling manufacturability, and the material characteristics of the plastic frame portion and the metal structure portion can match the mold so as to increase the product design flexibility.

The driving mechanism is disposed in the casing, and the driving mechanism is configured to drive a lens unit to move in a direction parallel to an optical axis.

The damping element is connected to the pins and the lens unit. The damping element provides cushion effect to absorb an over impact force, which is favorable for increasing the focus stability of the imaging lens driving module and preventing image shake. The damping element can be a high viscosity damping agent, but the present disclosure is not limited thereto.

The driving mechanism can include at least one magnet, at least one coil and at least one elastic element. The coil is disposed corresponding to the magnet, and the elastic element is coupled to the lens unit. The magnet and the coil are configured to interact with each other to produce a magnetic driving force (a Lorentz force generated by an electromagnetic interaction) for driving the lens unit to move in a direction parallel to optical axis. Therefore, it is favorable for the driving mechanism to have a proper space arrangement so as to optimize the driving efficiency of the electromagnetic force. Moreover, one of the magnet and the coil can be disposed on the lens unit. Therefore, it is favorable for ensuring that the driving mechanism is properly configured for efficient driving effect.

The number of the at least one elastic element of the driving mechanism can be two. In detail, the driving mechanism can include an upper elastic element and a lower elastic element disposed opposite to each other. The upper elastic element is connected to the casing and the lens unit, and the lower elastic element is disposed on an image side of the lens unit and connected to the base and the lens unit. The two elastic elements can define a driving movement range of the driving mechanism.

The lower elastic element of the driving mechanism can include an extension portion extending away from the optical axis in a direction perpendicular to the optical axis. Therefore, the extension portion being in physical contact with the casing is favorable for cushioning impact energy during focusing.

The casing can further include at least one bump structure disposed on an image-side surface of the plastic frame portion, wherein the image-side surface can be a surface of the plastic frame portion facing the base. In addition, the bump structure can extend towards the base and correspond to the extension portion of the lower elastic element. Therefore, the bump structure is favorable for reducing the contact area between the extension portion and the casing, which helps to eliminate the abnormal noise generated when the driving mechanism collides with the casing, thereby keeping the imaging lens driving module quiet during operation.

The bump structure of the casing can overlap with the extension portion of the lower elastic element in a direction parallel to the optical axis, so that the casing can shield the stray light reflected by the lower elastic element so as to prevent non-imaging light from entering the lens unit. In addition, when the bump structure and the extension portion of the lower elastic element collide with each other, they can eliminate the impact energy generated during focusing, thereby keeping the imaging lens driving module relatively quiet during operation.

The plastic frame portion and the bump structure of the casing can be made in one-piece. Therefore, it is favorable for the bump structure to be accurately positioned in the imaging lens driving module, thereby minimizing assembly tolerance.

According to the present disclosure, the imaging lens driving module can further include at least one stopper mechanism configured to restrict a movement of the lens unit in a direction parallel to the optical axis. Therefore, it is favorable for increasing the product availability of the imaging lens driving module. In one configuration, the stopper mechanism can be constituted by a part of the lens unit and a part of the base corresponding to each other so as to prevent damages due to collisions between the lens unit and an image surface. In one configuration, the stopper mechanism can be constituted by a part of the casing and a part of the lens unit corresponding to each other so as to prevent damages due to collisions between the pins of the metal structure portion and the lens unit.

The casing can further have an expansion portion extending away from the central aperture of the casing. Therefore, it is favorable for ensuring the image recognition accuracy when the automated machine is injecting the damping element.

The lens unit can have a notch structure extending towards the base so as to define the injection direction of the damping element, thereby increasing the efficiency of an automated process. Moreover, the notch structure and the expansion portion can correspond to each other, and the notch structure is exposed to an object side of the lens unit by the expansion portion; that is, as the lens unit is viewed from its object side toward the image side, the notch structure is visible via the expansion portion. Therefore, it is favorable for determining whether a step of injecting additional damping element is necessary according to process requirements, thereby preventing unnecessary waste of process resources.

The damping element can be disposed in the notch structure and connected to the pins of the metal structure portion. Therefore, it is favorable for the damping element to be connected to the pins of the metal structure portion and the lens unit, thereby providing cushion effect and thus improving the image quality. Moreover, the pins of the metal structure portion can extend into the notch structure so as to be in contact with the damping element without direct contact with the lens unit.

The plastic frame portion of the casing can have at least one step surface, and the step surface is located farther away from the base than the bump structure to the base. Therefore, it is favorable for designing the geometric configuration of the insert-molding mold and reducing the complexity of plastic molding mold design.

The plastic frame portion can have at least one gate trace located on the step surface. Therefore, it is favorable for providing the accommodation space for the gate trace of plastic molding and preventing the cutting surface of the gate trace from interfering with other mechanism. Furthermore, the step surface can ensure that the assembling quality of the casing is not affected by the cutting surface of the gate trace. Moreover, the number of the at least one gate trace can be at least four, but the present disclosure is not limited thereto.

The magnet of the driving mechanism and the extension portion of the lower elastic element can be alternatively disposed in a circumferential direction surrounding the optical axis. Therefore, it is favorable for improving the space utilization of the imaging lens driving module.

According to the present disclosure, the aforementioned features and conditions can be utilized in numerous combinations so as to achieve corresponding effects.

The present disclosure provides an electronic device which includes the aforementioned imaging lens driving module. By the cushion effect provided by the pins of the casing and the damping element to the lens unit, it is favorable for increasing the focus stability of the imaging lens driving module and preventing image shake so as to more accurately control the focus performance of the lens of the electronic device.

According to the above description of the present disclosure, the following specific embodiments are provided for further explanation.

1st Embodiment

Figure 2:
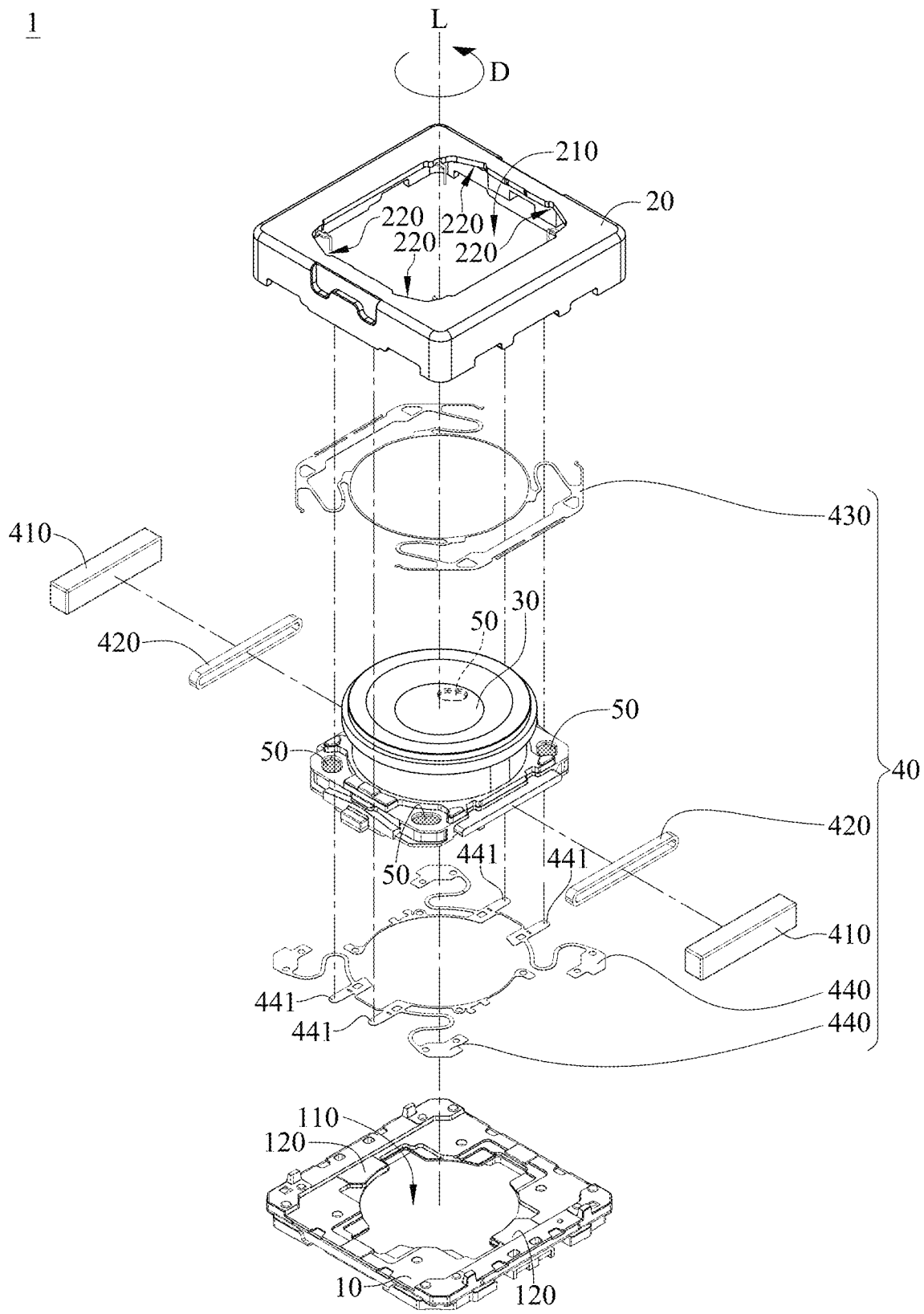
FIG. 2 is an exploded view of the imaging lens driving module in FIG. 1.
Figure 3:
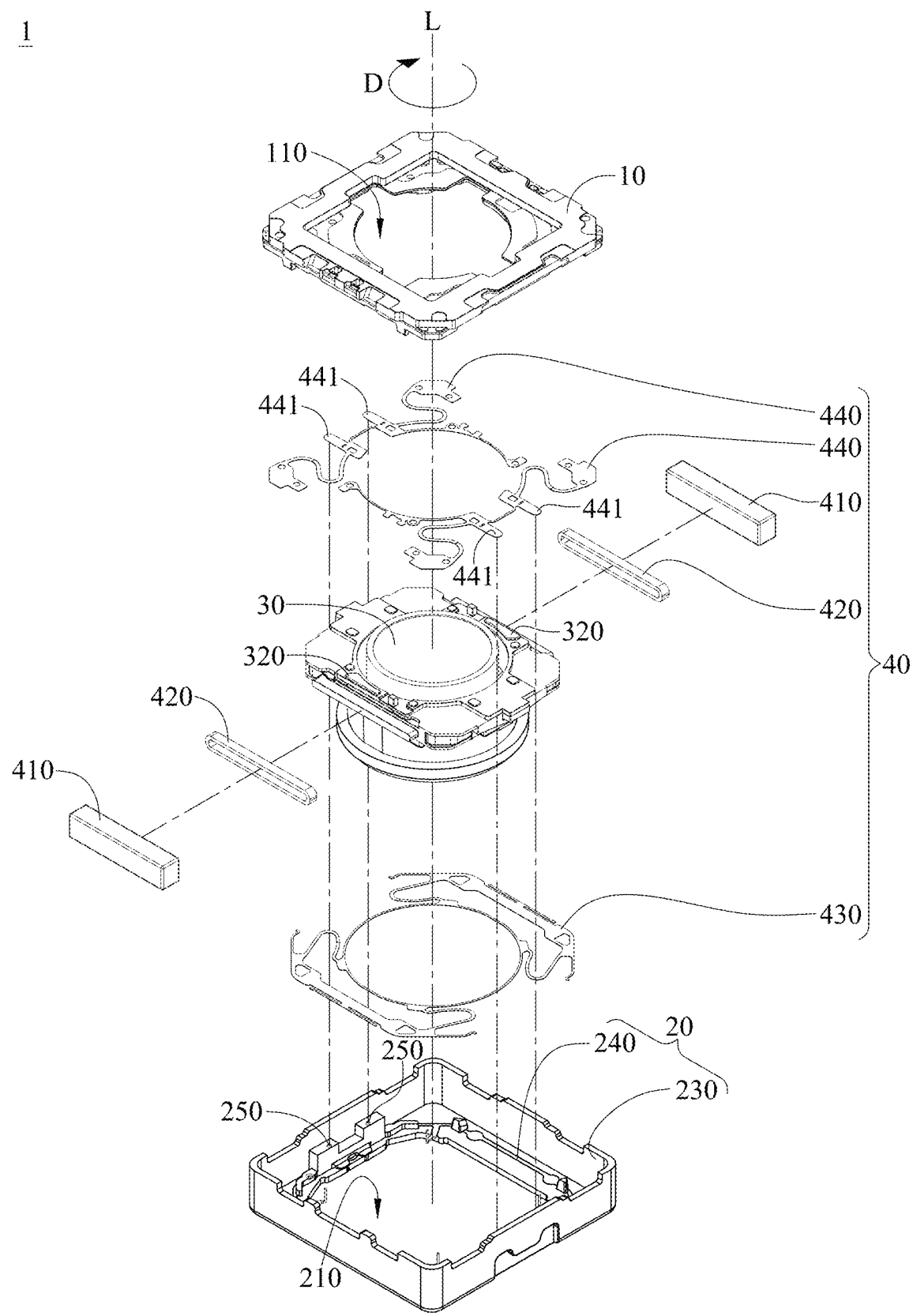
FIG. 3 is another exploded view of the imaging lens driving module in FIG. 1.
Figure 4:
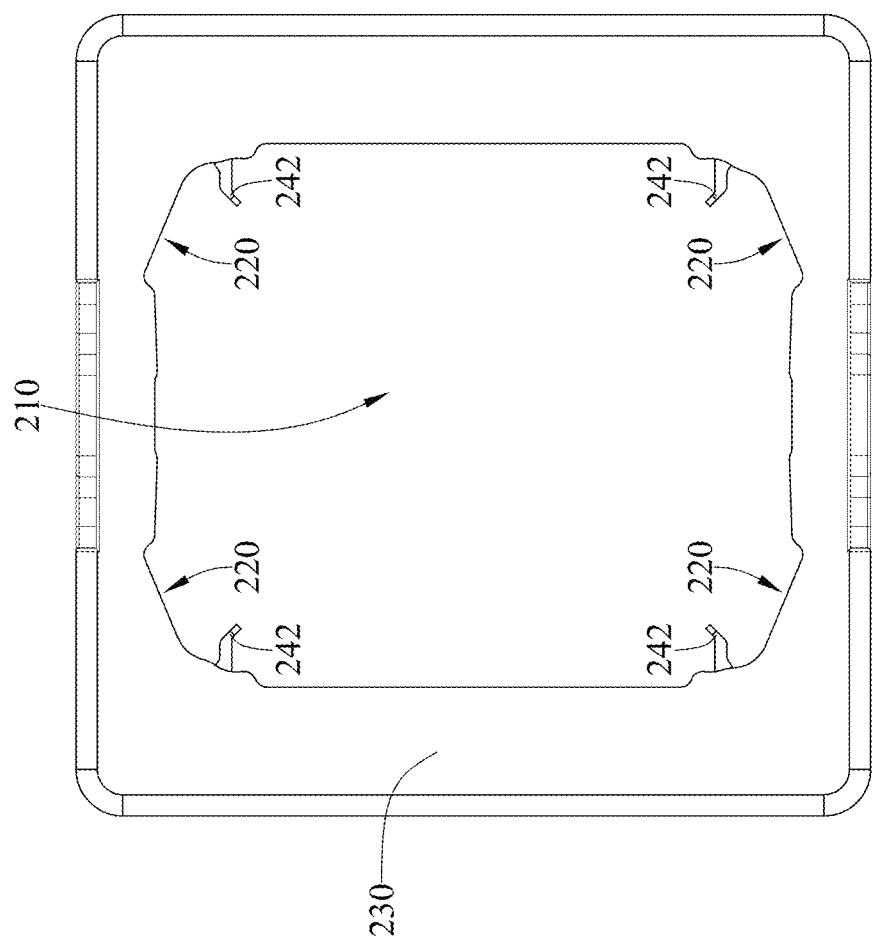
FIG. 4 is a top view of a casing of the imaging lens driving module in FIG. 1.
Figure 5:
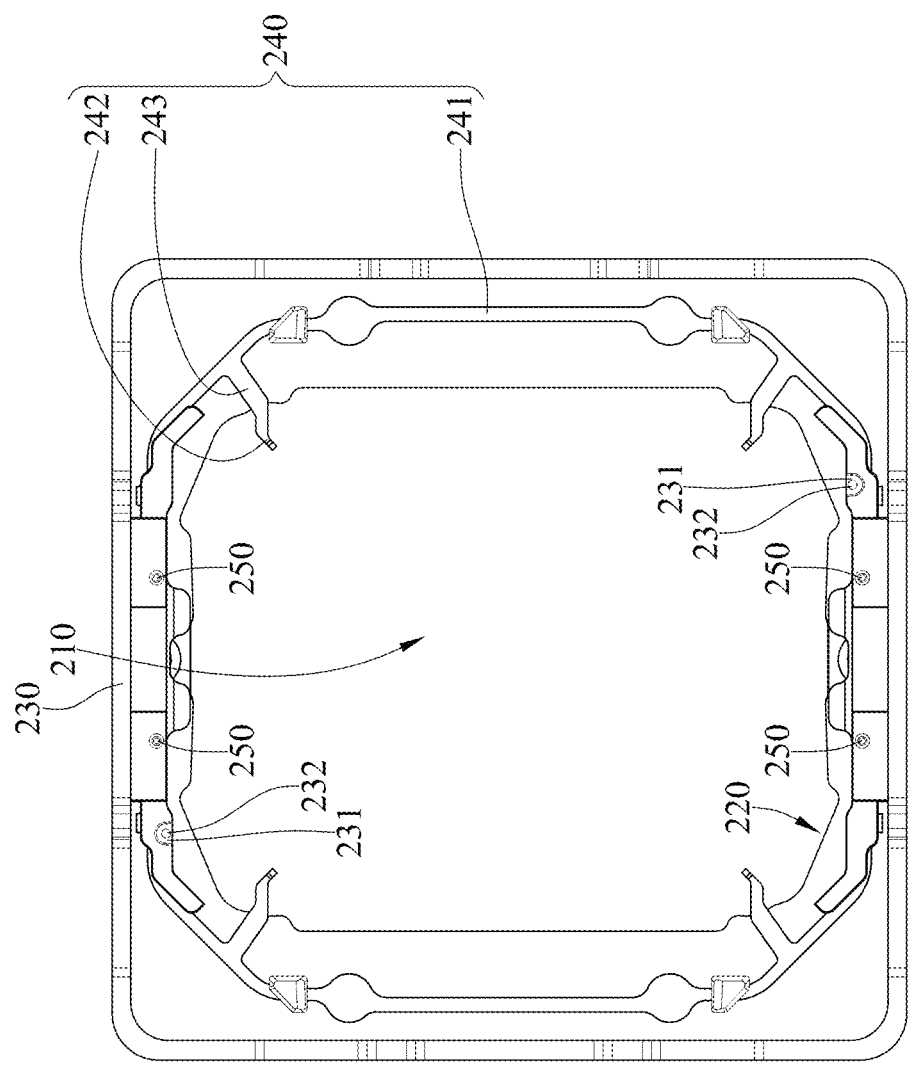
FIG. 5 is a bottom view of the casing of the imaging lens driving module in FIG. 1.

Please refer to FIG. 1 to FIG. 5, where FIG. 1 is a perspective view of an imaging lens driving module according to the 1st embodiment of the present disclosure, FIG. 2 is an exploded view of the imaging lens driving module in FIG. 1, FIG. 3 is another exploded view of the imaging lens driving module in FIG. 1, FIG. 4 is a top view of a casing of the imaging lens driving module in FIG. 1, and FIG. 5 is a bottom view of the casing of the imaging lens driving module in FIG. 1.

In this embodiment, an imaging lens driving module 1 includes a base 10, a casing 20, a lens unit 30, a driving mechanism 40 and four damping elements 50.

The base 10 has an opening 110, and the casing 20 has a central aperture 210 corresponding to the opening 110 of the base 10. The casing 20 further has four expansion portions 220 connected to the central aperture 210, and each of the expansion portions 220 extends away from the central aperture 210.

The casing 20 include a plastic frame portion 230 and a metal structure portion 240. The plastic frame portion 230 is coupled to the base 10, and the metal structure portion 240 is embedded in the plastic frame portion 230. The metal structure portion 240 includes a main portion 241 attached on the surface of the plastic frame portion 230, a plurality of pins 242 extending towards the base 10, and a plurality of connection arms 243 connected to the pins 242 and the main portion 241. The pins 242 are located closer to the optical axis L than the main portion 241 and the connection arms 243 to the optical axis L. In this embodiment, the plastic frame portion 230 has a rectangular appearance, and the plastic frame portion 230 is a one-piece formed plastic element surrounding the central aperture 210. In addition, the metal structure portion 240 is an elastically deformable metal material.

The lens unit 30 is movably disposed on the base 10 and the casing 20 and is disposed through the opening 110 of the base 10. The driving mechanism 40 is disposed in the casing 20, and the driving mechanism 40 is configured to drive the lens unit 30 to move in a direction parallel to optical axis L. In detail, the driving mechanism 40 includes two magnets 410, two coils 420, an upper elastic element 430 and two lower elastic elements 440. The coils 420 are disposed respectively corresponding to the magnets 410. In specific, the coils 420 are disposed on the lens unit 30, and the magnets 410 are disposed around the coils 420. In this embodiment, the magnets 410 are fixed to the upper elastic element 430 and the base 10 and clamped between the upper elastic element 430 and the base 10. The magnets 410 and the coils 420 are configured to interact with each other to produce a magnetic driving force for driving the lens unit 30 to move in a direction parallel to optical axis L. The upper elastic element 430 and the lower elastic elements 440 are coupled to the lens unit 30. The upper elastic element 430 is connected to the casing 20 and the lens unit 30, and the lower elastic elements 440 are disposed on an image side of the lens unit 30 and connected to the base 10 and the lens unit 30. The upper elastic element 430 and the lower elastic elements 440 can define a driving movement range of the driving mechanism 40.

Figure 6:
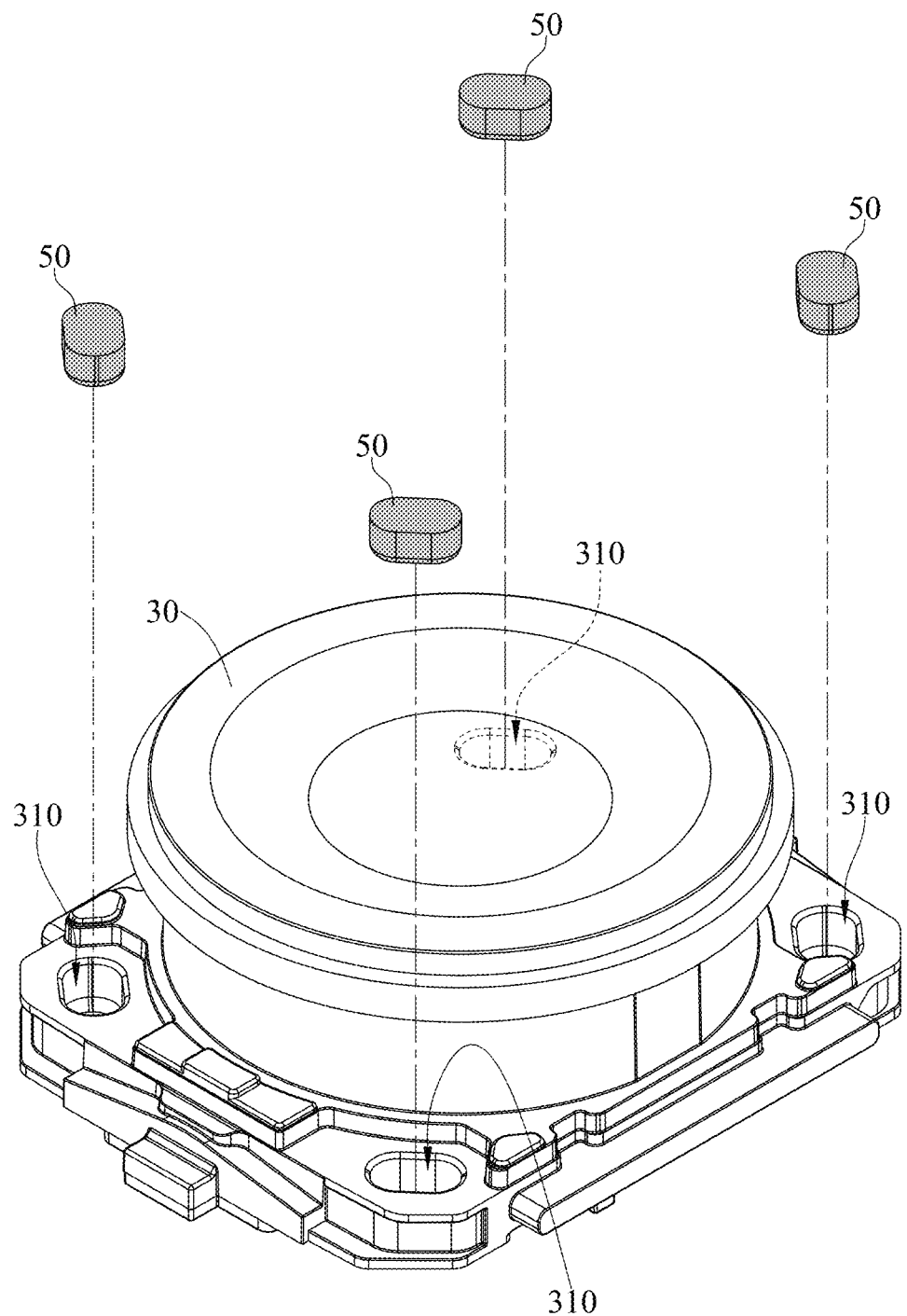
FIG. 6 is an exploded view of a lens unit and a damping element of the imaging lens driving module in FIG. 1.
Figure 7:
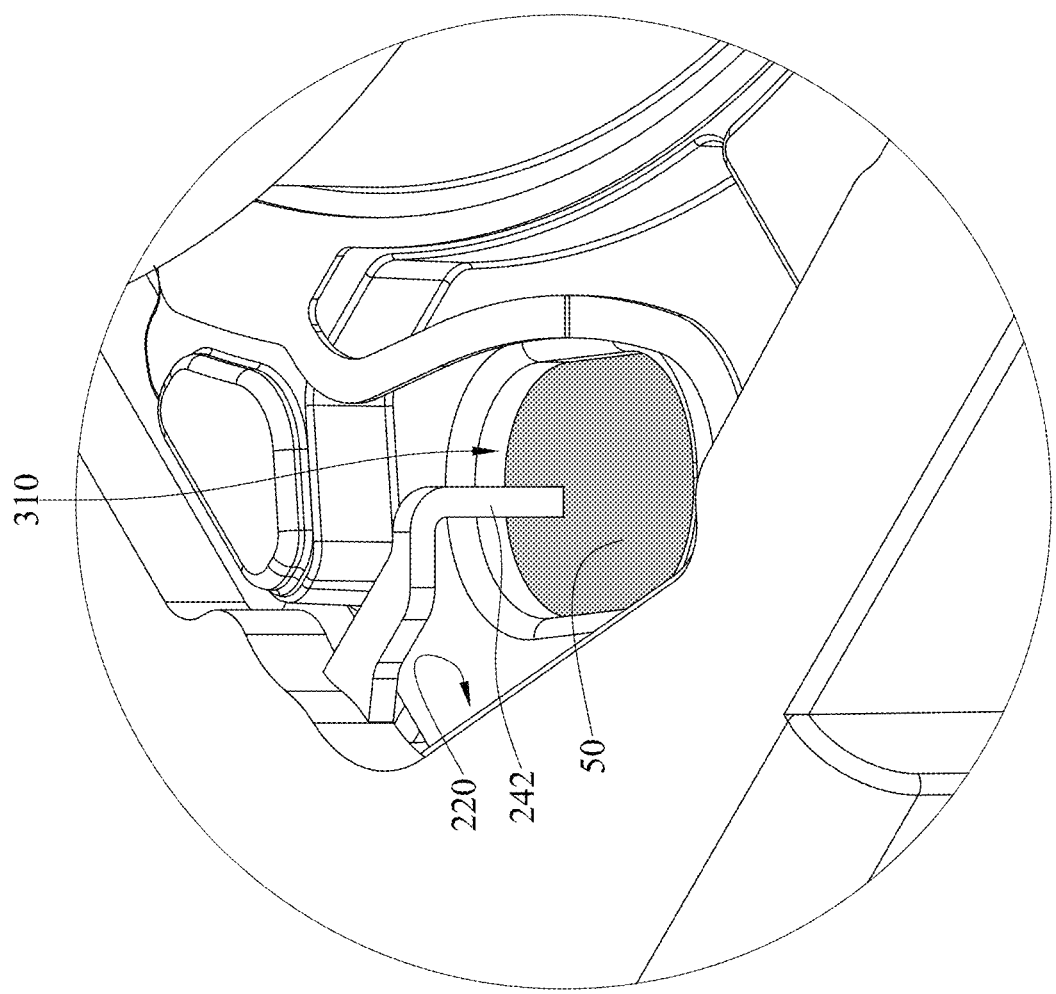
FIG. 7 is an enlarged view of region AA of the imaging lens driving module in FIG. 1.

Further referring to FIG. 6 and FIG. 7, where FIG. 6 is an exploded view of a lens unit and a damping element of the imaging lens driving module in FIG. 1, and FIG. 7 is an enlarged view of region AA of the imaging lens driving module in FIG. 1.

The damping elements 50 are connected to the pins 242 of the metal structure portion 240 and the lens unit 30. In detail, the lens unit 30 has four notch structures 310 extending towards the base 10. The notch structures 310 respectively correspond to the expansion portions 220 of the casing 20, and the notch structures 310 are exposed to an object side of the lens unit 30 by the expansion portions 220. As shown in FIG. 1 and FIG. 7, the lens unit 30 is viewed from its object side toward image side, and the notch structures 310 are visible via the expansion portions 220. The damping elements 50 are disposed in the notch structures 310 and connected to the pins 242 of the metal structure portion 240.

Specifically, the pins 242 of the metal structure portion 240 can extend into the notch structures 310 to so as to be in contact with the damping elements 50 without direct contact with the lens unit 30.

In this embodiment, the damping elements 50 were originally liquid high viscosity damping agent injected into the notch structures 310 and then were cured by exposure to UV-light during a manufacturing process. As such, the damping elements 50 in the notch structures 310 are formed with the shape shown in FIG. 6, but the present disclosure is not limited thereto.

Figure 8:
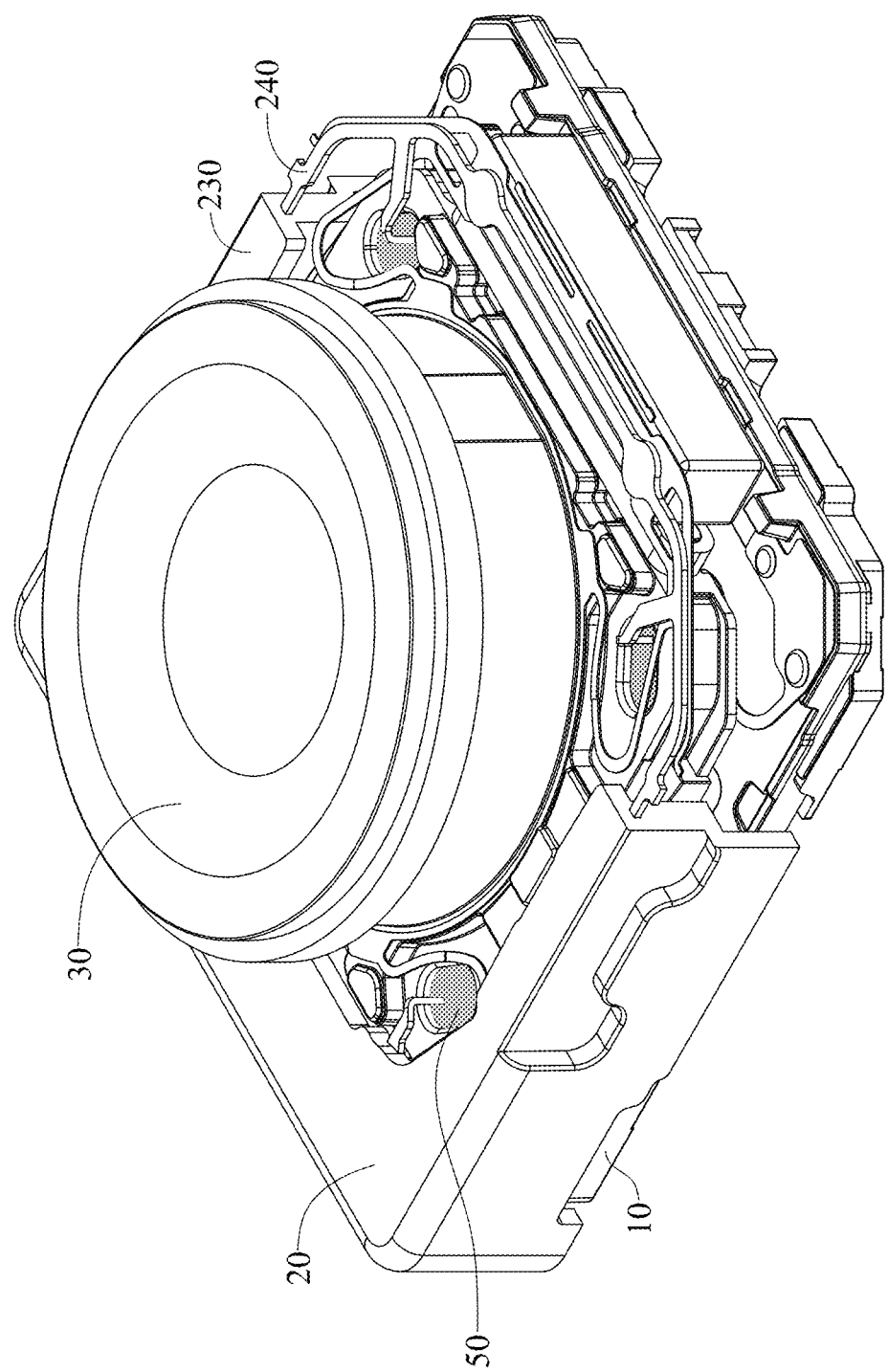
FIG. 8 is a partially sectioned view of the imaging lens driving module in FIG. 1.
Figure 9:
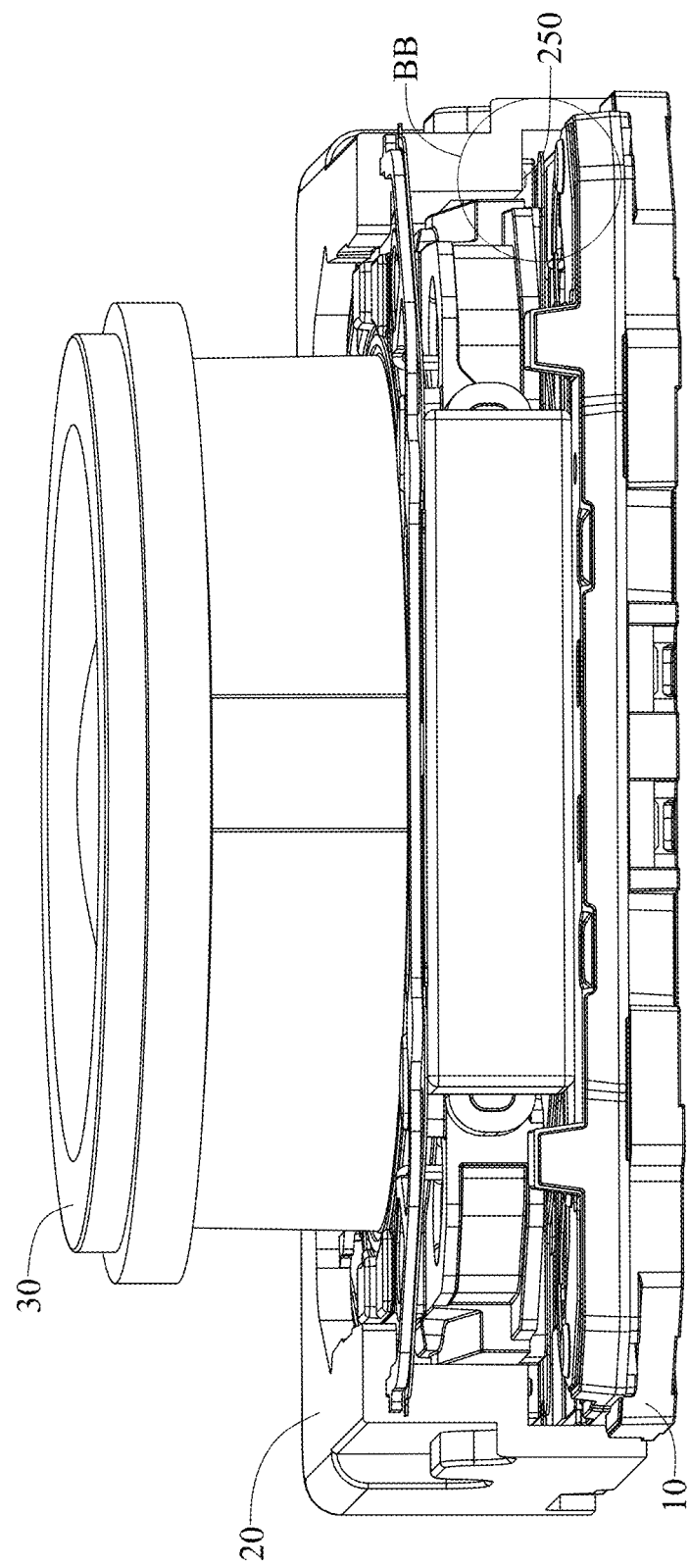
FIG. 9 is a side view of the sectioned imaging lens driving module in FIG. 8.
Figure 10:
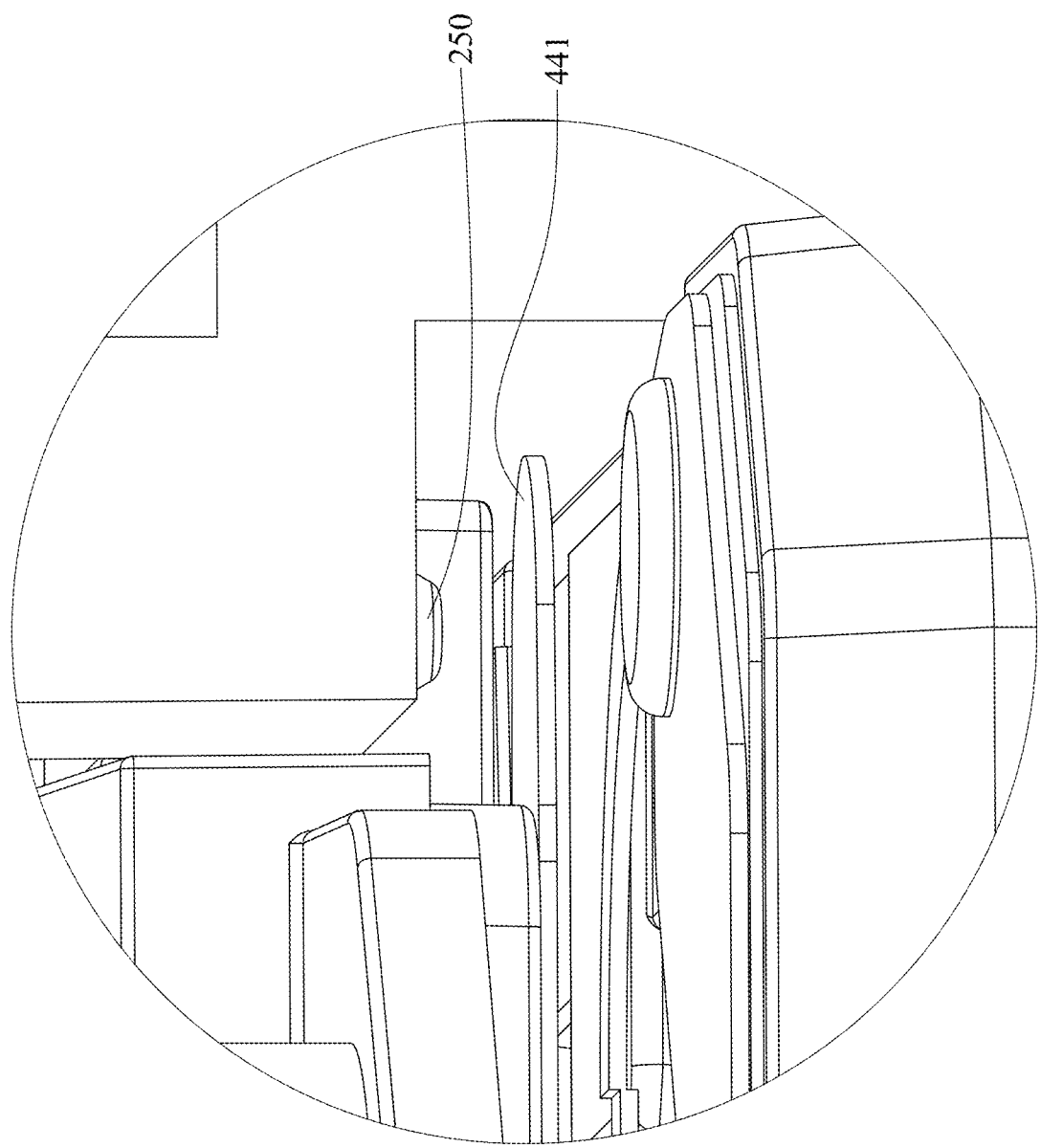
FIG. 10 is an enlarged view of region BB of the sectioned imaging lens driving module in FIG. 9.

Further referring to FIG. 8 to FIG. 10, where FIG. 8 is a partially sectioned view of the imaging lens driving module in FIG. 1, FIG. 9 is a side view of the sectioned imaging lens driving module in FIG. 8, and FIG. 10 is an enlarged view of region BB of the sectioned imaging lens driving module in FIG. 9. The casing 20 further includes four bump structures 250 disposed on an image-side surface of the plastic frame portion 230 facing the base 10, and the bump structures 250 extend towards the base 10. The two lower elastic elements 440 of the driving mechanism 40 each includes two extension portions 441 extending away from the optical axis L in a direction perpendicular to the optical axis L. The bump structures 250 overlap with the extension portions 441 in a direction parallel to the optical axis L, and as shown in FIG. 10, the bump structures 250 are disposed corresponding to the extension portions 441. In this embodiment, the plastic frame portion 230 and the bump structures 250 of the casing 20 are made in one-piece. Moreover, the magnets 410 and the extension portions 441 of the lower elastic elements 440 of the driving mechanism 40 are alternatively disposed in a circumferential direction D surrounding the optical axis L.

In this embodiment, a part of the lens unit 30 and a part of the base 10 are disposed corresponding to each other to form a stopper mechanism configured to restrict a movement of the lens unit 30 in a direction parallel to the optical axis L. In detail, the lens unit 30 has two first platforms 320 protruding towards the base 10, and the base 10 has two second platforms 120 protruding towards the lens unit 30. The first platforms 320 are respectively disposed corresponding to the second platforms 120 to be the stopper mechanism so as to prevent damages due to collisions between the lens unit 30 and an image surface.

Figure 11:
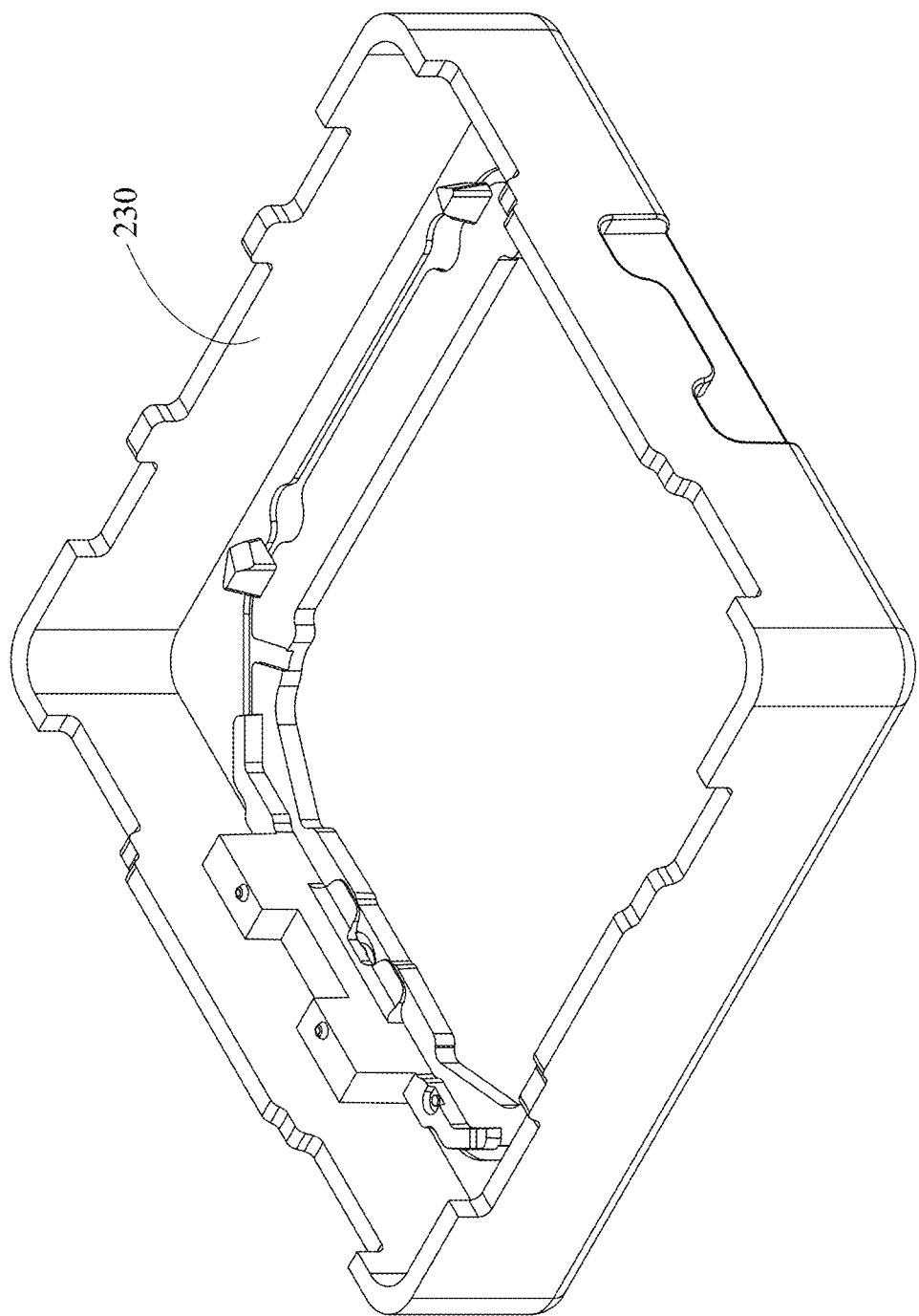
FIG. 11 is a perspective view of a plastic frame portion of the casing of the imaging lens driving module in FIG. 1.
Figure 12:
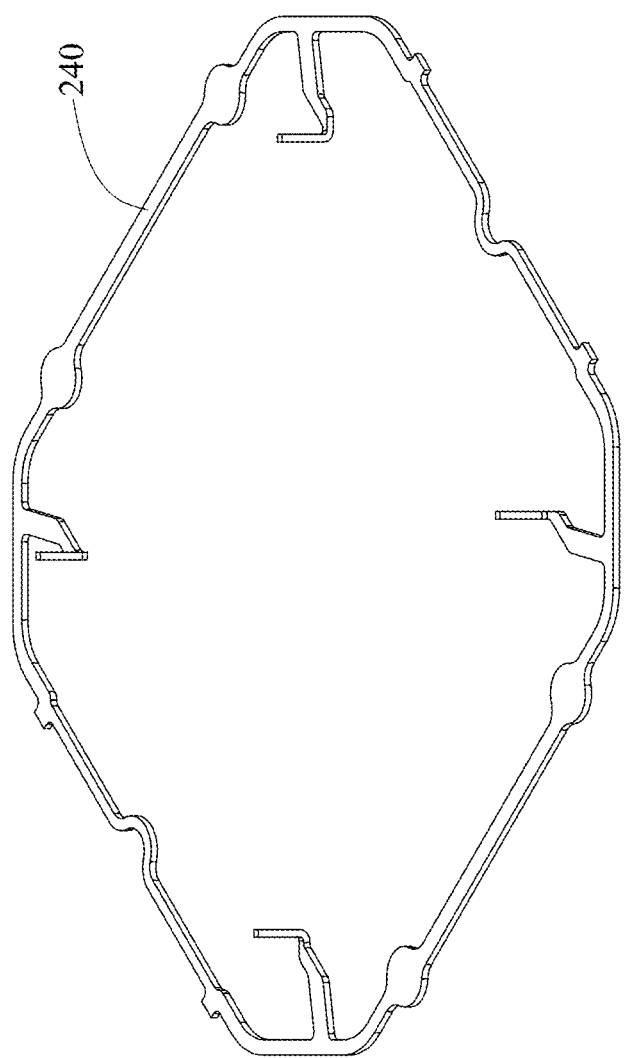
FIG. 12 is a perspective view of a metal structure portion of the casing of the imaging lens driving module in FIG. 1.
Figure 13:
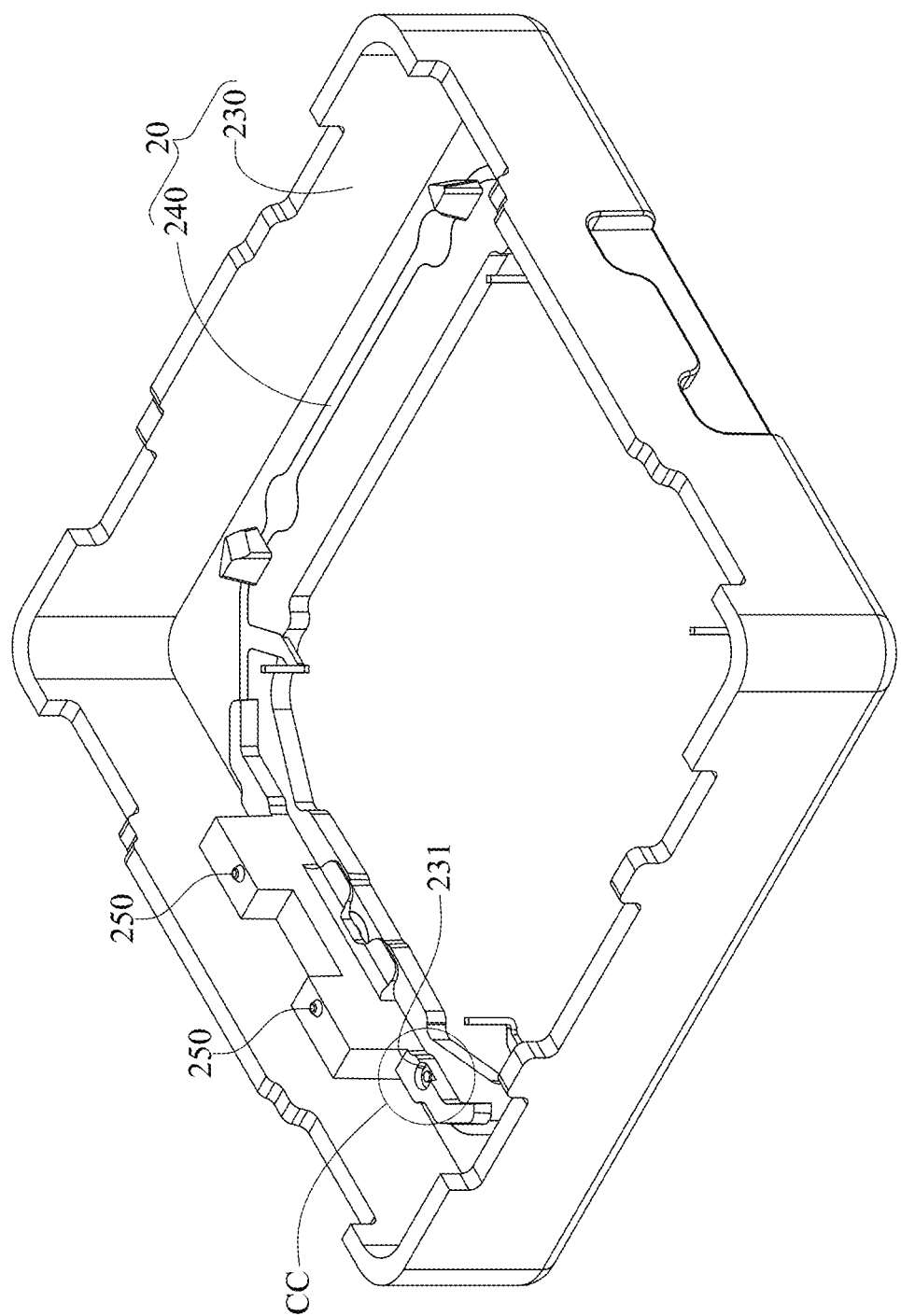
FIG. 13 is a perspective view of the casing of the imaging lens driving module in FIG. 1.

Further referring to FIG. 11 to FIG. 13, where FIG. 11 is a perspective view of a plastic frame portion of the casing of the imaging lens driving module in FIG. 1, FIG. 12 is a perspective view of a metal structure portion of the casing of the imaging lens driving module in FIG. 1, and FIG. 13 is a perspective view of the casing of the imaging lens driving module in FIG. 1.

The metal structure portion 240 is insert-molded with the plastic frame portion 230 to form the casing 20. For example, the casing 20 is formed by placing the metal structure portion 240 (as shown in FIG. 12) in a mold, and then injecting a selected plastic material so as to form the plastic frame portion 230 (as shown in FIG. 11) onto the metal structure portion 240, such that the metal structure portion 240 is embedded in the plastic frame portion 230, and the casing 20 (as shown in FIG. 13) is thereby formed.

Figure 14:
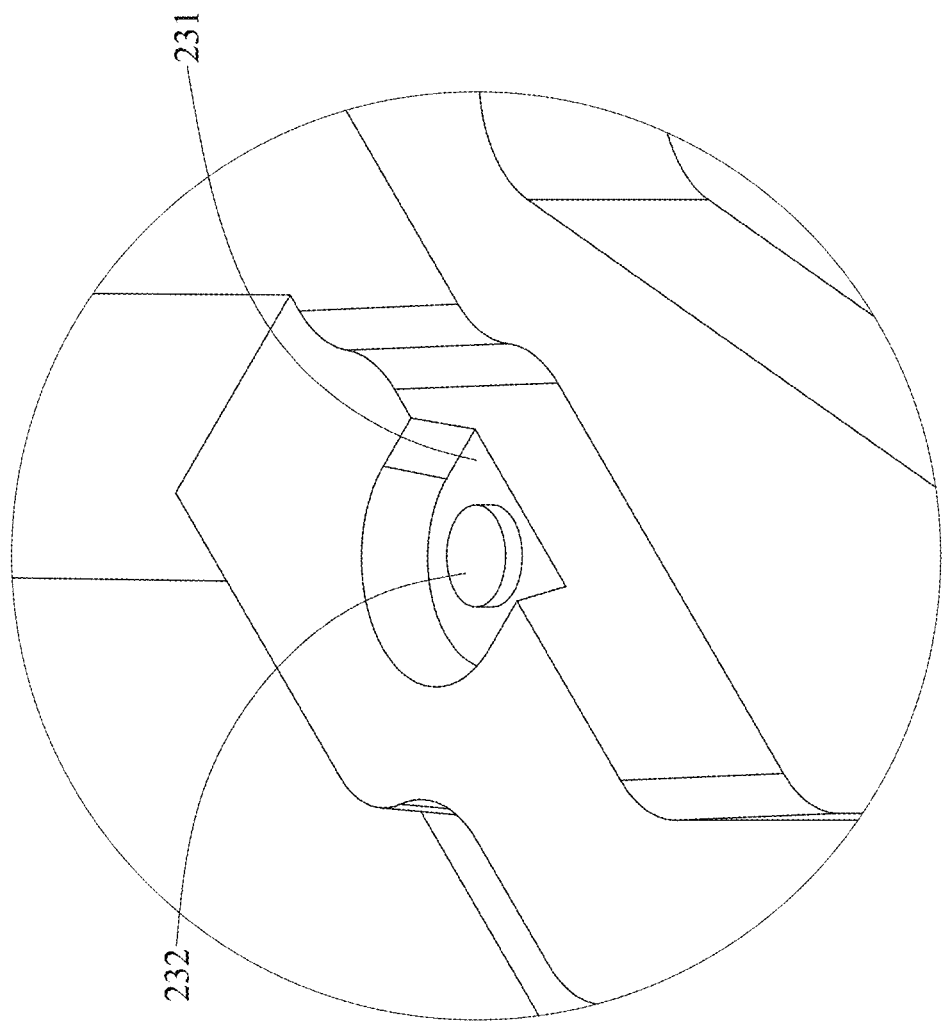
FIG. 14 is an enlarged view of region CC of the casing in FIG. 13.

FIG. 14 is an enlarged view of region CC of the casing in FIG. 13. In this embodiment, the plastic frame portion 230 of the casing 20 has two step surfaces 231 symmetrically disposed around the optical axis L, and step surfaces 231 are located farther away from the base 10 than the bump structures 250 to the base 10. Furthermore, the plastic frame portion 230 has two gate traces 232 respectively located on the two step surfaces 231.

2nd Embodiment

Figure 15:
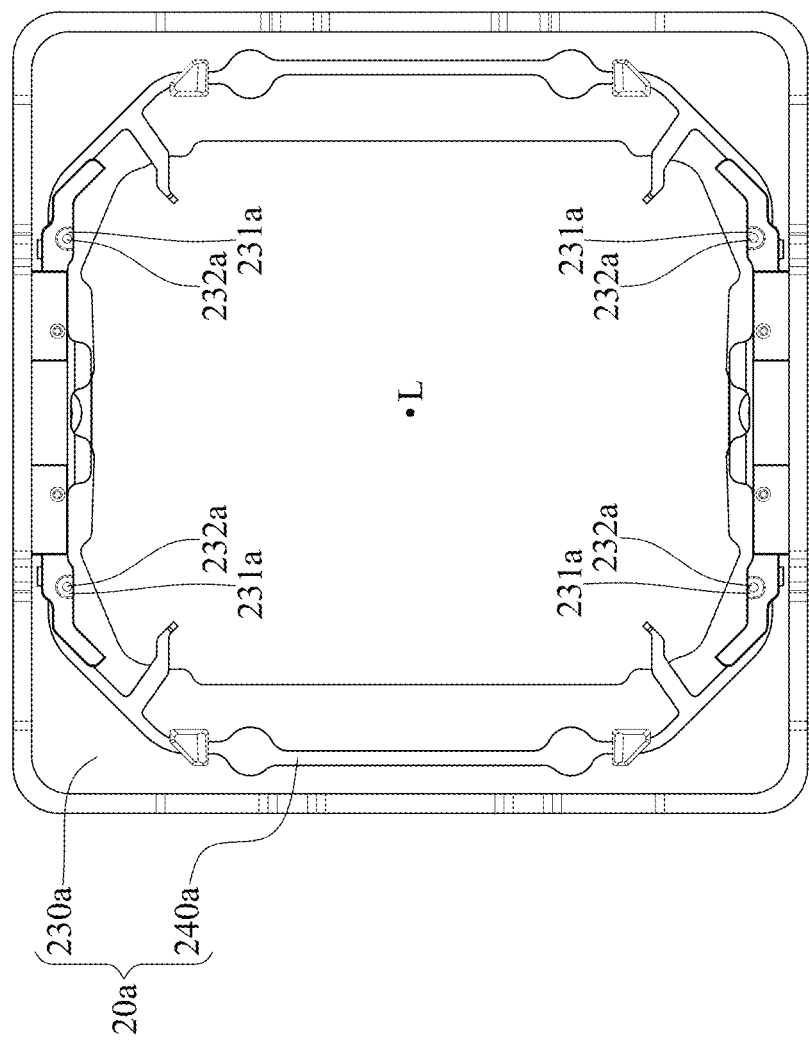
FIG. 15 is a bottom view of a casing of an imaging lens driving module according to the 2nd embodiment of the present disclosure.
Figure 16:
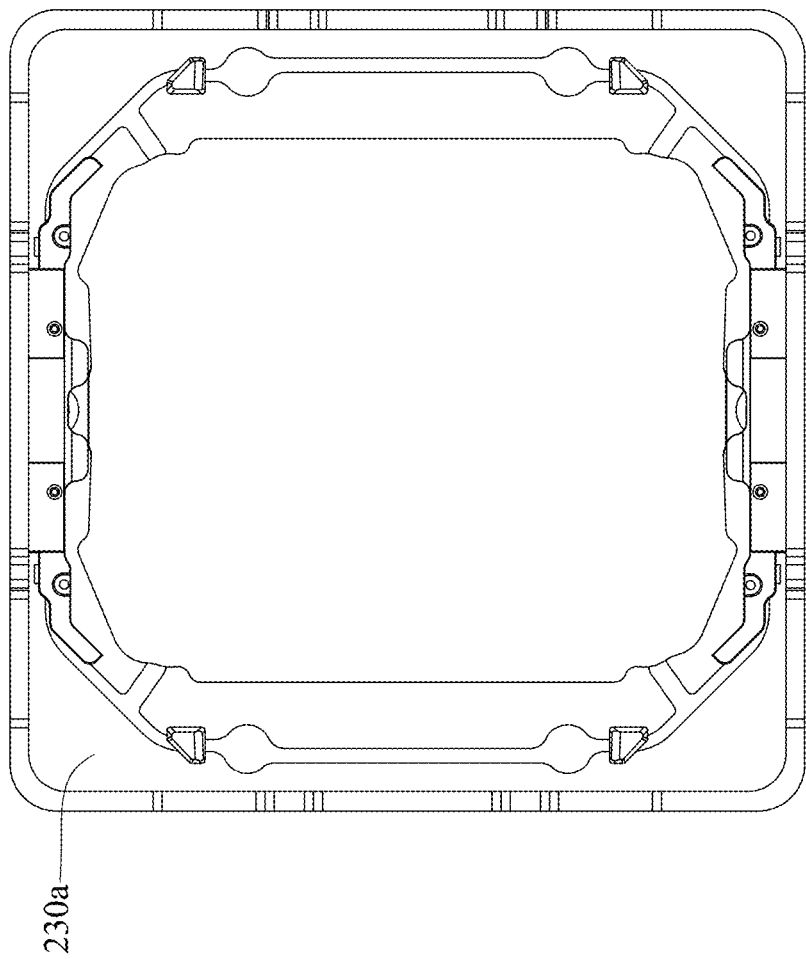
FIG. 16 is a schematic view of a plastic frame portion of the casing in FIG. 15.
Figure 17:
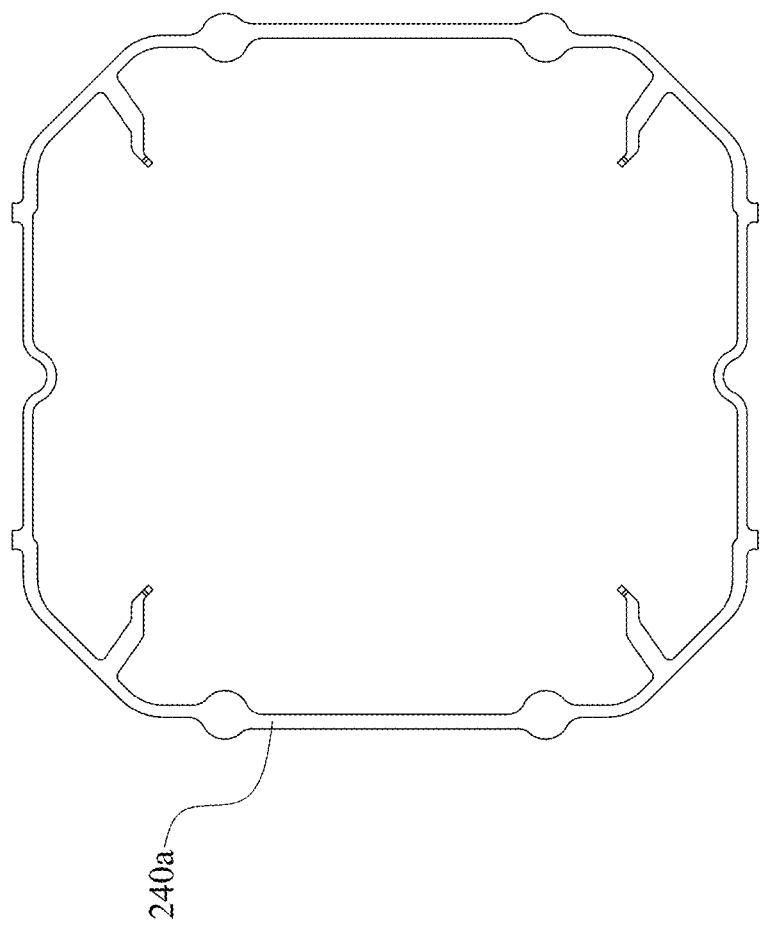
FIG. 17 is a schematic view of a metal structure portion of the casing in FIG. 15.

Please refer to FIG. 15 to FIG. 17, where FIG. 15 is a bottom view of a casing of an imaging lens driving module according to the 2nd embodiment of the present disclosure, FIG. 16 is a schematic view of a plastic frame portion of the casing in FIG. 15, and FIG. 17 is a schematic view of a metal structure portion of the casing in FIG. 15.

A casing 20a in this embodiment is similar to the casing 20 in the 1st embodiment, and only the differences therebetween are described below.

A plastic frame portion 230a of the casing 20a includes four step surfaces 231a, and the number of gate traces 232a of the plastic frame portion 230a is four. The step surfaces 231a are disposed symmetrically around the optical axis L, and the gate traces 232a are respectively located on the four step surfaces 231a.

In this embodiment, a metal structure portion 240a is insert-molded with the plastic frame portion 230a to form the casing 20a. For example, the casing 20a is formed by placing the metal structure portion 240a (as shown in FIG. 17) in a mold, and then injecting a selected plastic material so as to form the plastic frame portion 230a (as shown in FIG. 16) onto the metal structure portion 240a, such that the metal structure portion 240a is embedded in the plastic frame portion 230a, and the casing 20a (as shown in FIG. 15) is thereby formed.

3rd Embodiment

Figure 18:
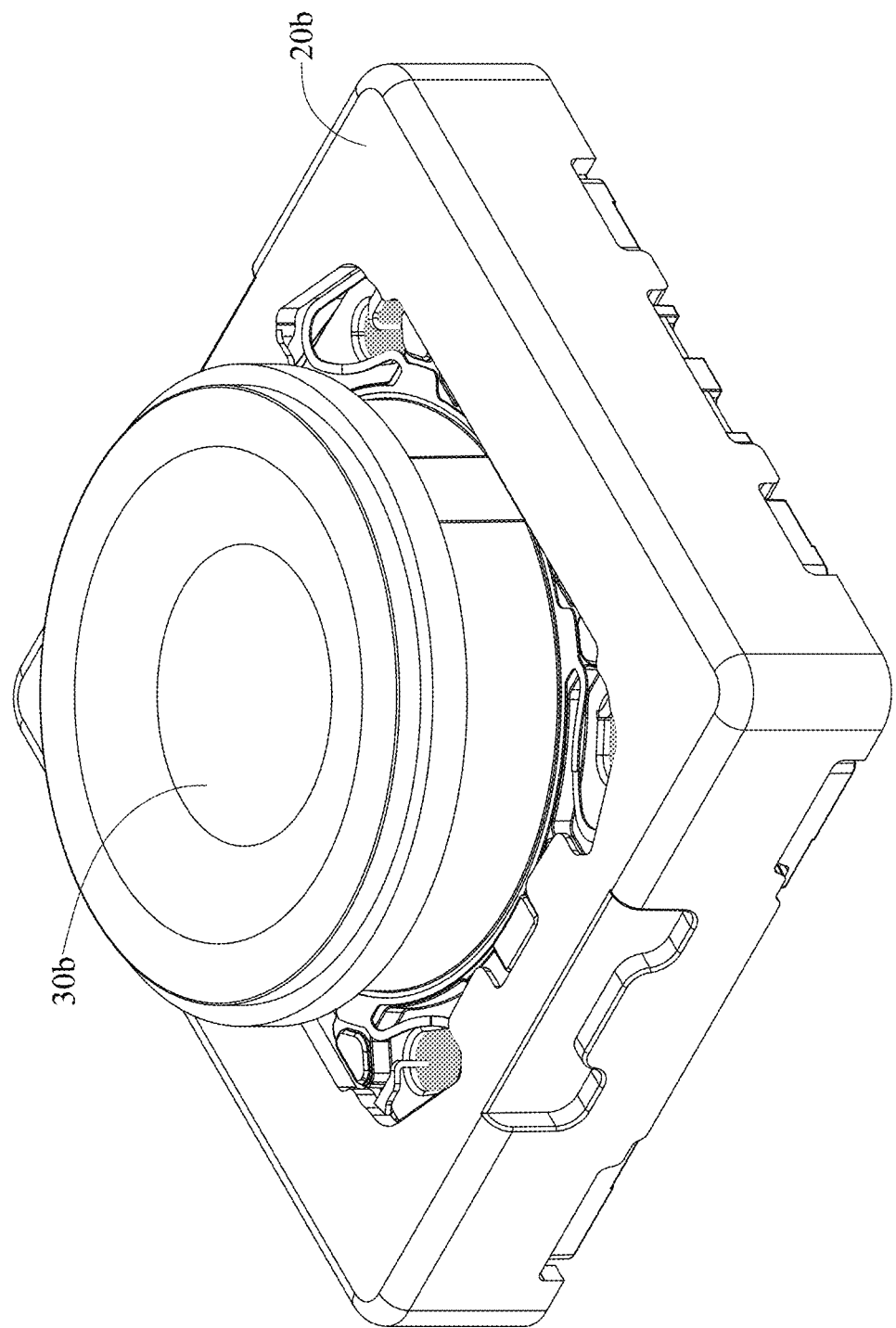
FIG. 18 is a perspective view of an imaging lens driving module according to the 3rd embodiment of the present disclosure.
Figure 19:
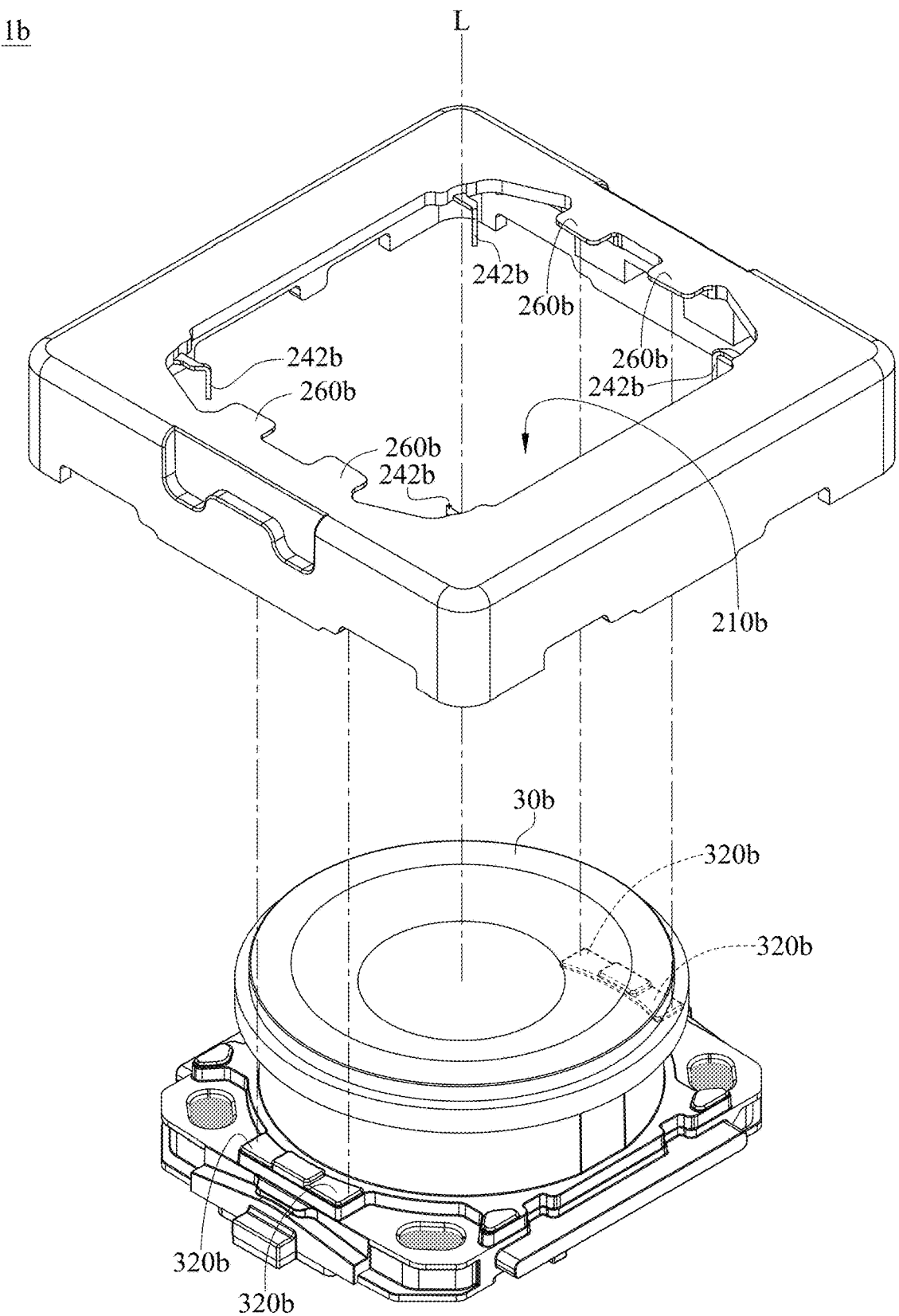
FIG. 19 is an exploded view of a casing and a lens unit of the imaging lens driving module in FIG. 18.
Figure 20:
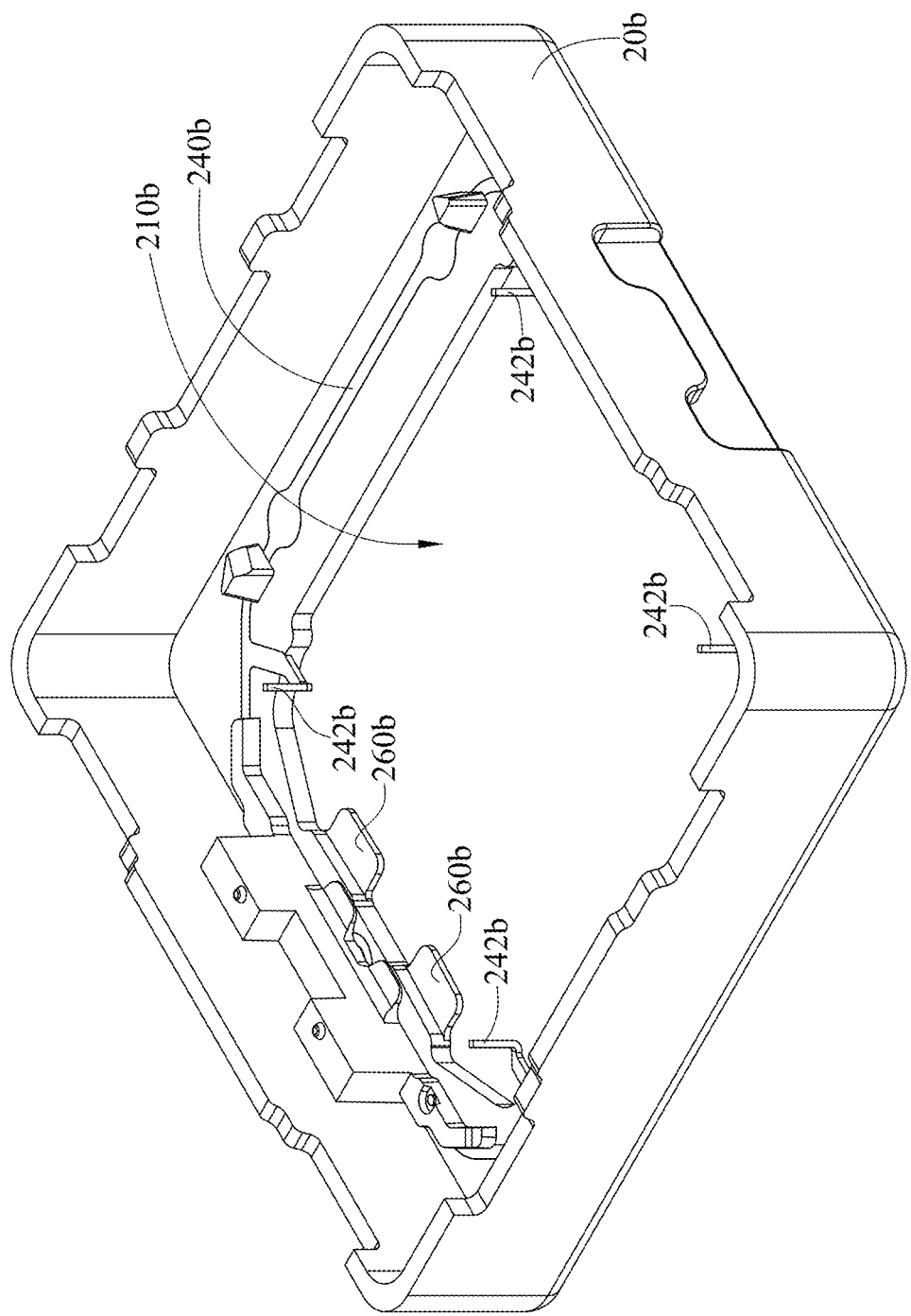
FIG. 20 is another perspective view of the casing in FIG. 18.

Please refer to FIG. 18 to FIG. 20, where FIG. 18 is a perspective view of an imaging lens driving module according to the 3rd embodiment of the present disclosure, FIG. 19 is an exploded view of a casing and a lens unit of the imaging lens driving module in FIG. 18, and FIG. 20 is another perspective view of the casing in FIG. 18.

In this embodiment, an imaging lens driving module 1b is provided. The imaging lens driving module 1b is similar to the imaging lens driving module 1 in the 1st embodiment, and only the differences therebetween are described below.

A stopper mechanism of the imaging lens driving module 1b is constituted by a part of a casing 20b and a part of a lens unit 30b corresponding to each other to restrict a movement of the lens unit 30b in a direction parallel to the optical axis L. In detail, the lens unit 30b has four stopper surfaces 320b facing the casing 20b, and the casing 20b has four extending stopper portions 260b extending inwardly from a periphery of a central aperture 210b. The stopper surfaces 320b are disposed respectively corresponding to the extending stopper portions 260b to be the stopper mechanism so as to prevent damages due to collisions between pins 242b of a metal structure portion 240b and the lens unit 30b.

4th Embodiment

Figure 21:
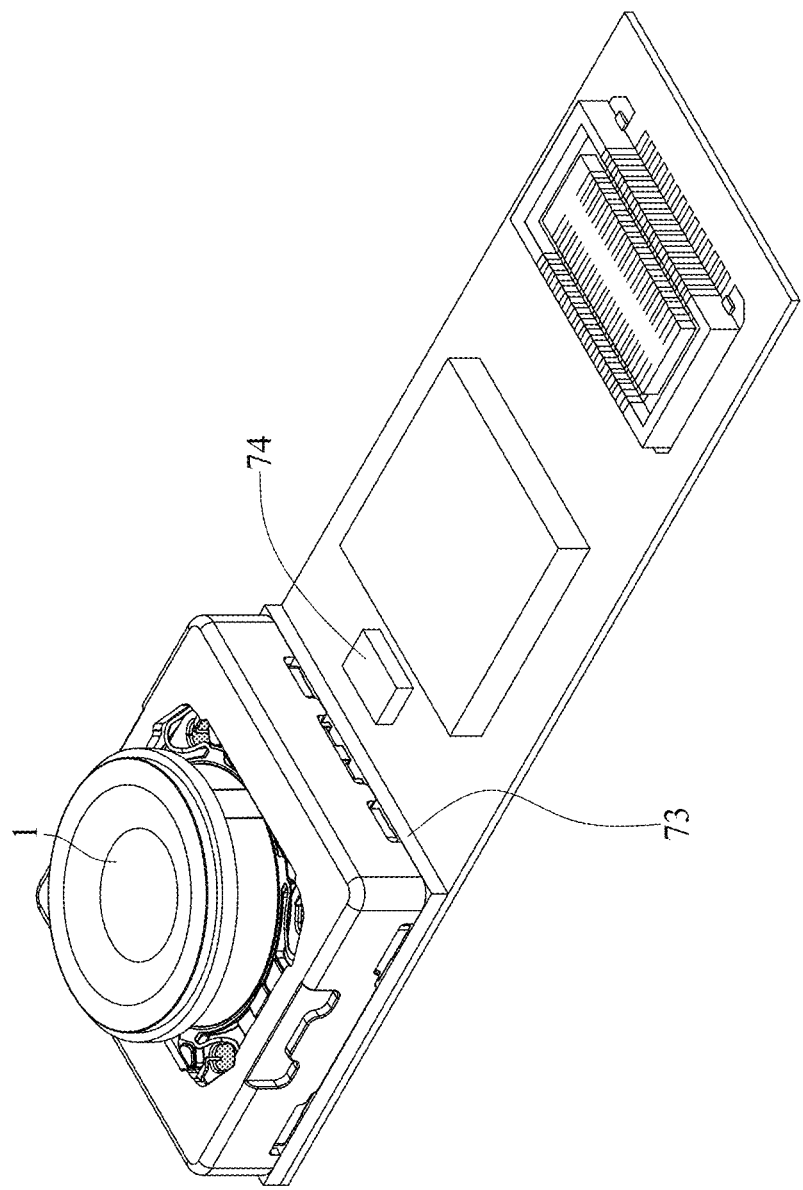
FIG. 21 is a perspective view of an image capturing unit according to the 4th embodiment of the present disclosure.

Please refer to FIG. 21, which is a perspective view of an image capturing unit according to the 4th embodiment of the present disclosure. In this embodiment, an image capturing unit 70 is a camera module including the imaging lens driving module 1 disclosed in the 1st embodiment, an image sensor 73 and an image stabilizer 74. However, in other configurations, the image capturing unit 70 may include the imaging lens driving module disclosed in the 2nd embodiment or 3rd embodiment, and the present disclosure is not limited thereto. The imaging light converges in the lens unit 30 of the imaging lens driving module 1 to generate an image with the driving mechanism 40 utilized for image focusing on the image surface and the image sensor 73, and the generated image is then digitally transmitted to other electronic component for further processing.

The driving mechanism 40 is favorable for obtaining a better imaging position of the lens unit 30, so that a clear and sharp image of the imaged object can be captured by the lens unit 30 in different object distances. In addition, the image capturing unit 70 can be provided with the image sensor 73 (for example, CMOS or CCD), which can feature high photosensitivity and low noise, disposed on the image surface of the imaging lens driving module 1 to provide higher image quality.

The image stabilizer 74, such as an accelerometer, a gyro sensor and a Hall Effect sensor, is configured to work with the driving mechanism 40 to provide optical image stabilization (OIS). The driving mechanism 40 working with the image stabilizer 74 is favorable for compensating for pan and tilt of the lens unit 30 to reduce blurring associated with motion during exposure. In some cases, the compensation can be provided by electronic image stabilization (EIS) with image processing software, thereby improving image quality while in motion or low-light conditions.

Figure 22:
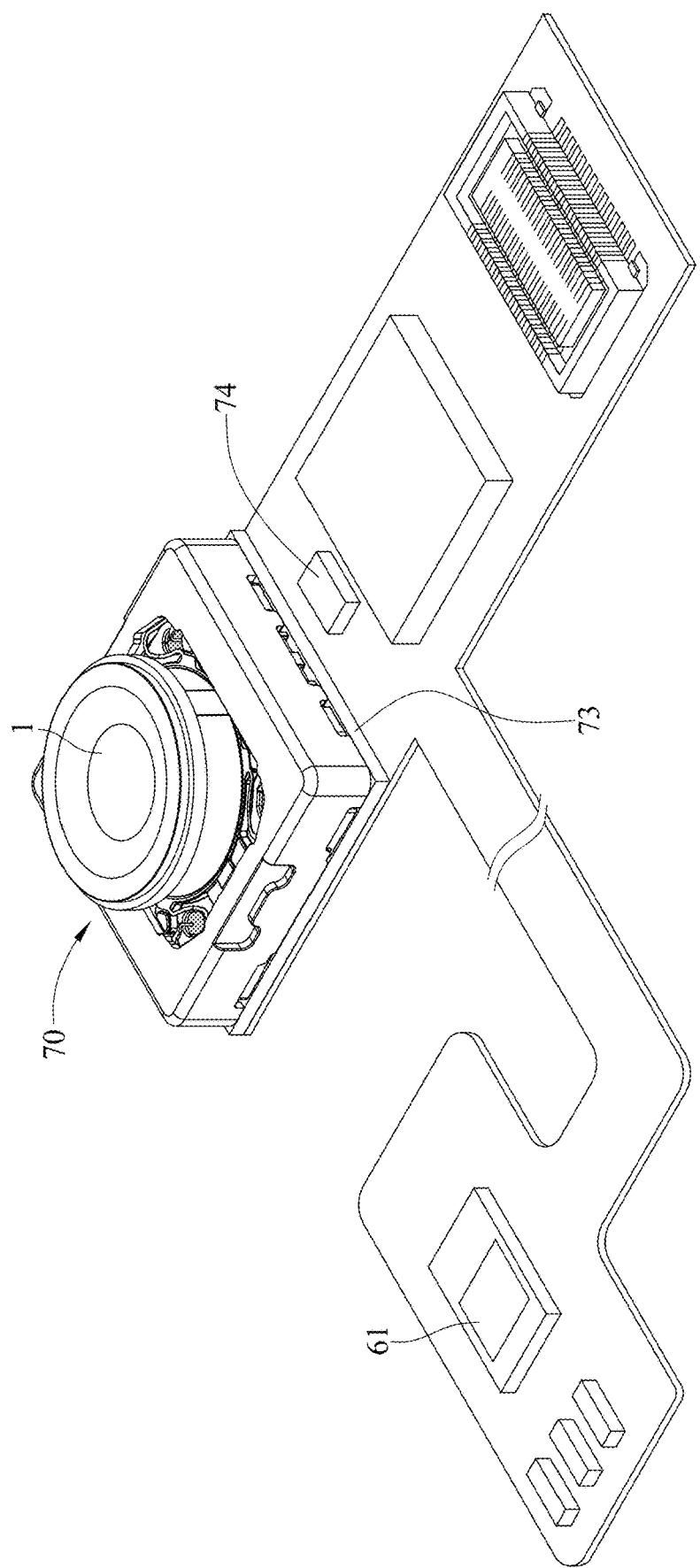
FIG. 22 is a perspective view of another image capturing unit according to one embodiment of the present disclosure.

The present disclosure is not limited to the image capturing unit 70 in FIG. 21. FIG. 22 is a perspective view of another image capturing unit according to one embodiment of the present disclosure, wherein the image capturing unit 70 further includes a flash module 61, which can be activated for light supplement when capturing images to improve image quality.

Figure 23:
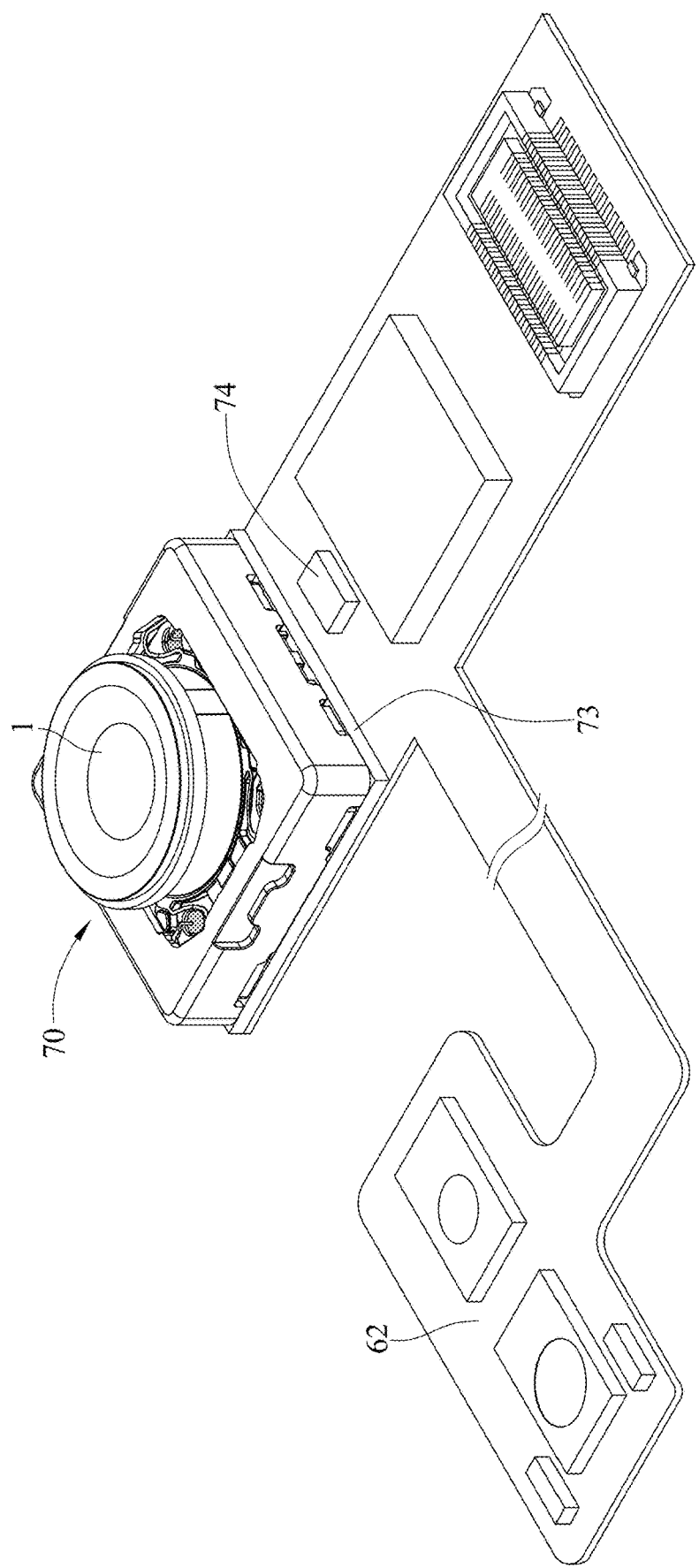
FIG. 23 is a perspective view of another image capturing unit according to one embodiment of the present disclosure.

FIG. 23 is a perspective view of still another image capturing unit according to one embodiment of the present disclosure, wherein the image capturing unit 70 further includes a focus assist module 62 configured to detect an object distance to achieve fast auto focusing. The light beam emitted from the focus assist module 62 can be either conventional infrared or laser.

5th Embodiment

Figure 24:
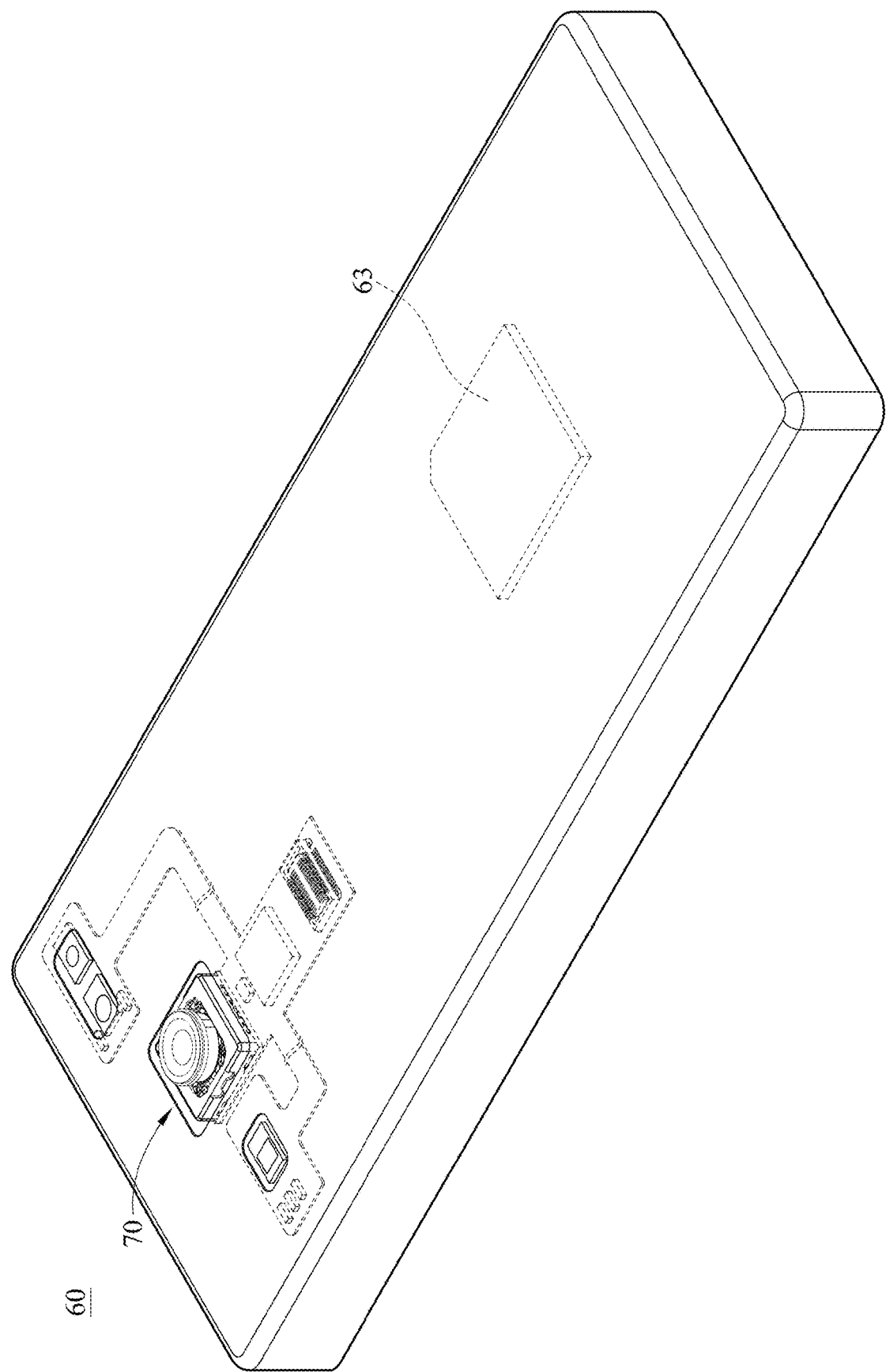
FIG. 24 is one perspective view of an electronic device according to the 5th embodiment of the present disclosure.
Figure 25:
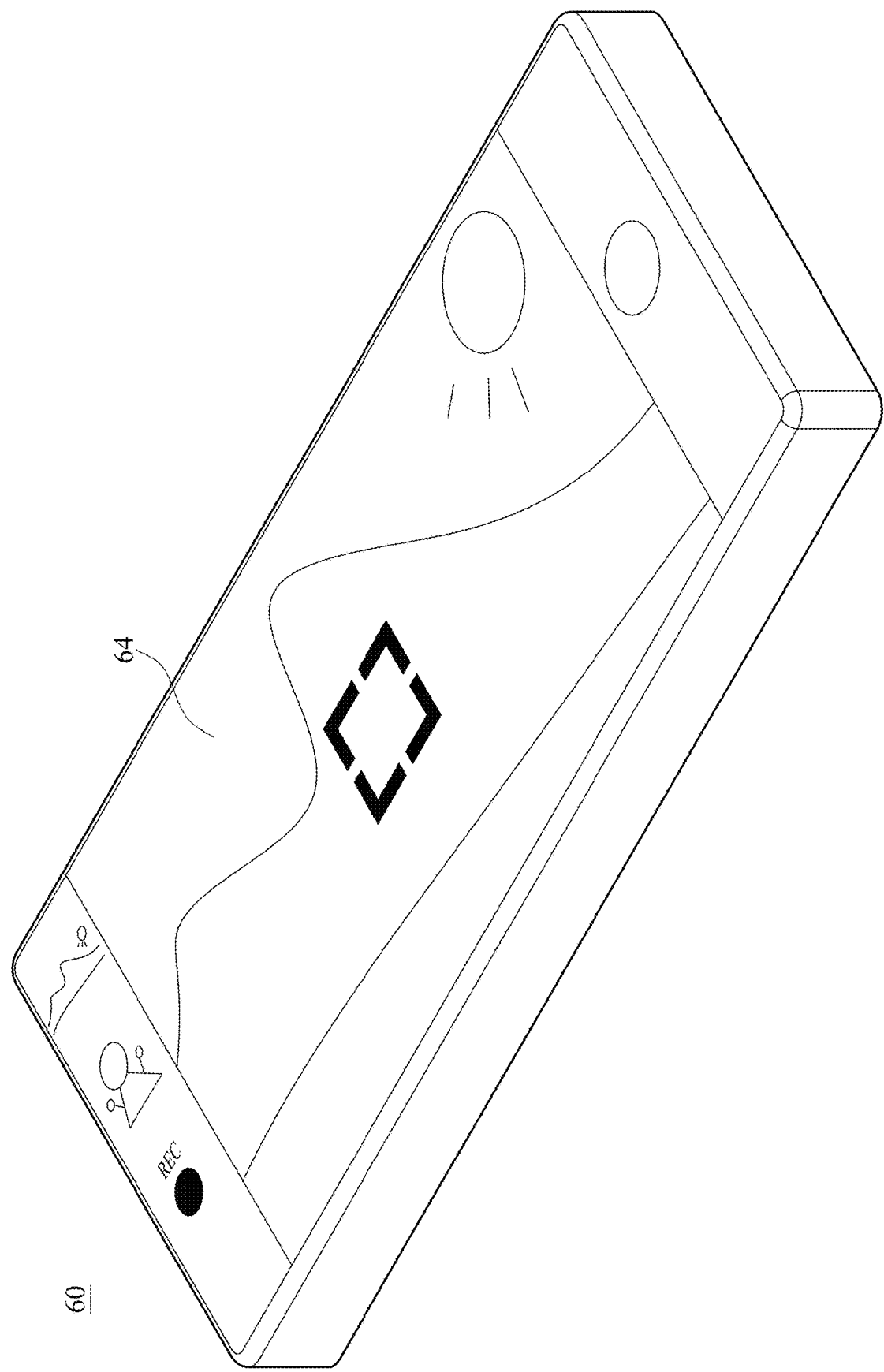
FIG. 25 is another perspective view of the electronic device in FIG. 24.
Figure 26:
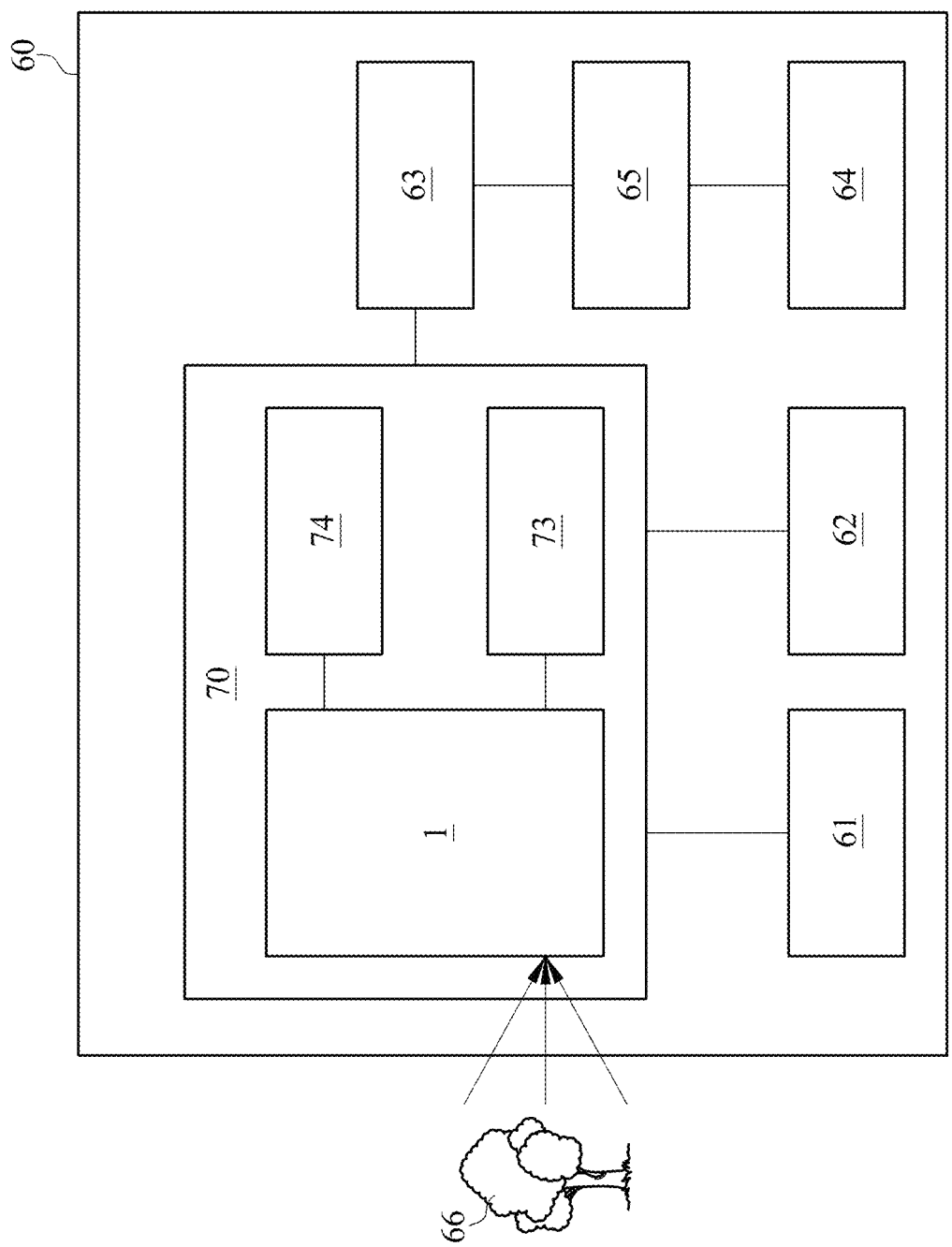
FIG. 26 is a block diagram of the electronic device in FIG. 24.

Please refer to FIG. 24 to FIG. 26, where FIG. 24 is one perspective view of an electronic device according to the 5th embodiment of the present disclosure, FIG. 25 is another perspective view of the electronic device in FIG. 24, and FIG. 26 is a block diagram of the electronic device in FIG. 24.

In this embodiment, an electronic device 60 is a smartphone including the image capturing unit 70 disclosed in the 4th embodiment, an image signal processor 63, a display unit (user interface) 64 and an image software processor 65. In this embodiment, the image capturing unit 70 includes the imaging lens driving module 1, the image sensor 73, the image stabilizer 74, the flash module 61 and the focus assist module 62.

When a user captures images of an object 66, the light rays converge in the image capturing unit 70 to generate an image(s), and the flash module 61 is activated for light supplement. The focus assist module 62 detects the object distance of the imaged object 66 to achieve fast auto focusing. The image signal processor 63 is configured to optimize the captured image to improve image quality. The light beam emitted from the focus assist module 62 can be either conventional infrared or laser. The display unit 64 can be a touch screen or have a physical shutter button. The user is able to interact with the display unit 64 and the image software processor 65 having multiple functions to capture images and complete image processing. The image processed by the image software processor 65 can be displayed on the display unit 64.

Figure 27:
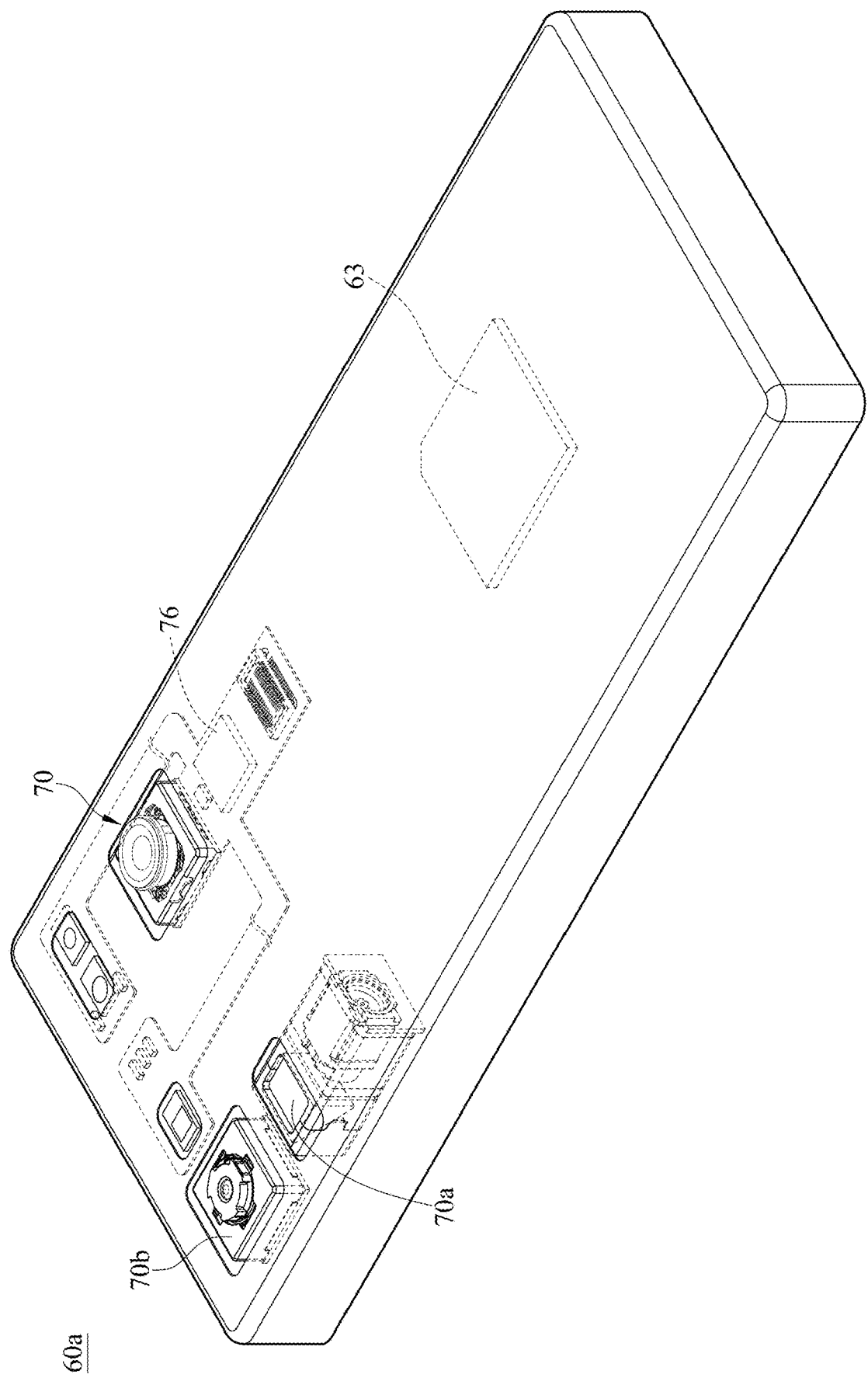
FIG. 27 is a perspective view of another electronic device according to one embodiment of the present disclosure.

The electronic device of the present disclosure is not limited to the number of image capturing units as described above. FIG. 27 is a perspective view of another electronic device according to one embodiment of the present disclosure. An electronic device 60a is similar to the electronic device 60, and the electronic device 60a further includes an image capturing unit 70a and an image capturing unit 70b. The image capturing unit 70, the image capturing unit 70a and the image capturing unit 70b all face the same direction and each has a single focal point. In addition, the image capturing unit 70, the image capturing unit 70a and the image capturing unit 70b have different fields of view (e.g., the image capturing unit 70a is a telephoto image capturing unit, the image capturing unit 70b is a wide-angle image capturing unit, and the image capturing unit 70 has a field of view ranging between the image capturing unit 70a and the image capturing unit 70b), such that the electronic device 60a has various magnification ratios so as to meet the requirement of optical zoom functionality. Furthermore, in this embodiment, the image capturing unit 70 further includes an expansion image signal processor 76. When the image capturing unit 70 works with the telephoto image capturing unit 70a and wide-angle image capturing unit 70b, the expansion image signal processor 76 provides zoom functionality for images on the touch screen so as to meet image processing requirements for multiple image capturing units. The electronic device 60a equipped with the image capturing unit 70 has various modes of different photographing functions, such as zoom function, telephotography, multi-camera recording, selfie-optimized function, and high dynamic range (HDR) and 4K resolution imaging under low-light conditions.

The smartphone in this embodiment is only exemplary for showing the imaging lens driving module of the present disclosure installed in an electronic device, and the present disclosure is not limited thereto. The imaging lens driving module can be optionally applied to optical systems with a movable focus. Furthermore, the imaging lens driving module features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens driving module, comprising:
a base, having an opening;
a casing, having a central aperture corresponding to the opening of the base, and the casing comprising:
  a plastic frame portion, coupled to the base; and
  a metal structure portion, having a plurality of pins extending toward the base;
a driving mechanism, disposed in the casing, wherein the driving mechanism is configured to drive a lens unit to move in a direction parallel to an optical axis; and
a damping element, connected to the plurality of pins and the lens unit;
wherein the metal structure portion is insert-molded with the plastic frame portion to form the casing, and the plurality of pins of the metal structure portion are located closer to the optical axis than other part of the metal structure portion to the optical axis;
wherein the casing further has an expansion portion extending away from the central aperture.

2. The imaging lens driving module of claim 1, wherein the driving mechanism comprises:
at least one magnet;
at least one coil, disposed corresponding to the at least one magnet, wherein the lens unit is movable in a direction parallel to the optical axis by a magnetic driving force generated by an interaction between the at least one magnet and the at least one coil; and
at least one elastic element, coupled to the lens unit.

3. The imaging lens driving module of claim 2, wherein one of the at least one magnet and the at least one coil is disposed on the lens unit.

4. The imaging lens driving module of claim 2, wherein a number of the at least one elastic element is two, the two elastic elements are an upper elastic element and a lower elastic element, the upper elastic element is connected to the casing and the lens unit, the lower elastic element is disposed on an image side of the lens unit and connected to the base and the lens unit, and the lower elastic element and the upper elastic element are disposed opposite to each other.

5. The imaging lens driving module of claim 4, wherein the lower elastic element comprises an extension portion, and the extension portion extends away from the optical axis in a direction perpendicular to the optical axis.

6. The imaging lens driving module of claim 5, wherein the casing further comprises at least one bump structure, and the at least one bump structure extends towards the base and corresponds to the extension portion of the lower elastic element.

7. The imaging lens driving module of claim 6, wherein the at least one bump structure overlaps with the extension portion of the lower elastic element in a direction parallel to the optical axis.

8. The imaging lens driving module of claim 6, wherein the plastic frame portion and the at least one bump structure are made in one-piece.

9. The imaging lens driving module of claim 1, further comprising at least one stopper mechanism, wherein the at least one stopper mechanism is configured to restrict a movement of the lens unit in a direction parallel to the optical axis.

10. The imaging lens driving module of claim 1, wherein the lens unit has a notch structure extending towards the base.

11. The imaging lens driving module of claim 10, wherein the notch structure and the expansion portion correspond to each other, and the notch structure is exposed to an object side of the lens unit by the expansion portion.

12. The imaging lens driving module of claim 11, wherein the damping element is disposed in the notch structure and connected to the plurality of pins of the metal structure portion.

13. The imaging lens driving module of claim 6, wherein the plastic frame portion of the casing has a step surface, and the step surface is located farther away from the base than the at least one bump structure to the base.

14. The imaging lens driving module of claim 13, wherein the plastic frame portion has at least one gate trace located on the step surface.

15. The imaging lens driving module of claim 5, wherein the at least one magnet and the extension portion of the lower elastic element are alternatively disposed in a circumferential direction surrounding the optical axis.

16. An electronic device, comprising the imaging lens driving module of claim 1.

* * * * *